U011496977B2

United States Patent
Nagata et al.

(10) Patent No.: US 11,496,977 B2
(45) Date of Patent: Nov. 8, 2022

(54) USER APPARATUS, BASE STATION, DISCOVERY SIGNAL RECEPTION METHOD AND DISCOVERY SIGNAL TRANSMISSION METHOD

(71) Applicant: NTT DOCOMO, INC., Tokyo (JP)

(72) Inventors: Satoshi Nagata, Tokyo (JP); Qun Zhao, Beijing (CN); Yongsheng Zhang, Beijing (CN); Katsutoshi Kusume, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/906,173

(22) PCT Filed: Jul. 15, 2014

(86) PCT No.: PCT/JP2014/068789
§ 371 (c)(1),
(2) Date: Jan. 19, 2016

(87) PCT Pub. No.: WO2015/008749
PCT Pub. Date: Jan. 22, 2015

(65) Prior Publication Data
US 2016/0165559 A1 Jun. 9, 2016

(30) Foreign Application Priority Data
Jul. 19, 2013 (JP) .............................. JP2013-151061

(51) Int. Cl.
*H04W 56/00* (2009.01)
*H04W 8/00* (2009.01)
(Continued)

(52) U.S. Cl.
CPC ......... *H04W 56/002* (2013.01); *H04W 8/005* (2013.01); *H04W 72/042* (2013.01); *H04W 76/14* (2018.02); *H04W 92/18* (2013.01)

(58) Field of Classification Search
None
See application file for complete search history.

(56) References Cited

U.S. PATENT DOCUMENTS 5,440,561 A * 8/1995 Werronen ............. H04J 3/0682
455/524
7,110,781 B1 * 9/2006 Hulbert ................. H04J 3/0682
370/503
(Continued)

FOREIGN PATENT DOCUMENTS

EP 3001748 A1 3/2016
JP 2012-209893 A 10/2012
(Continued)

OTHER PUBLICATIONS

International Search Report issued in PCT/JP2014/068789 dated Sep. 9, 2014 (2 pages).
(Continued)

*Primary Examiner* — Andrew C Oh
(74) *Attorney, Agent, or Firm* — Osha Bergman Watanabe & Burton LLP

(57) ABSTRACT

A user apparatus, for use in a radio communication system including a base station forming a cell, configured to receive a discovery signal of device-to-device communication, including: an information reception unit configured to receive, from a base station of a residing cell, a resource range in which a discovery signal can be transmitted in a neighbor cell; and a discovery signal reception unit configured to receive a discovery signal at a time position that is synchronized with the neighbor cell in response to receiving a synchronization signal that is synchronized with the neighbor cell within the resource range received by the information reception unit.

6 Claims, 30 Drawing Sheets

(a)

(b)

(51) Int. Cl.
*H04W 76/14* (2018.01)
*H04W 72/04* (2009.01)
*H04W 92/18* (2009.01)

(56) References Cited

U.S. PATENT DOCUMENTS

| | | | | |
|---|---|---|---|---|
| 8,060,097 B1* | 11/2011 | Rai | H04W 36/0005 | 370/320 |
| 8,588,087 B2* | 11/2013 | Jiao | H04L 5/0007 | 370/335 |
| 2010/0309861 A1* | 12/2010 | Gorokhov | H04B 1/7103 | 370/329 |
| 2011/0007672 A1* | 1/2011 | Park | H04W 16/14 | 370/280 |
| 2011/0281571 A1* | 11/2011 | Patel | H04W 56/0015 | 455/418 |
| 2011/0317569 A1* | 12/2011 | Kneckt | H04W 74/0833 | 370/252 |
| 2012/0051445 A1* | 3/2012 | Frank | H04L 5/0048 | 375/259 |
| 2012/0113843 A1* | 5/2012 | Watfa | H04W 72/1289 | 370/252 |
| 2012/0258706 A1* | 10/2012 | Yu | H04W 56/0045 | 455/552.1 |
| 2013/0083779 A1 | 4/2013 | Ahn et al. | | |
| 2013/0115944 A1* | 5/2013 | Tavildar | H04W 48/12 | 455/434 |
| 2013/0122893 A1* | 5/2013 | Turtinen | H04W 8/005 | 455/423 |
| 2013/0122929 A1* | 5/2013 | Al-Mufti | H04W 64/003 | 455/456.1 |
| 2013/0170470 A1* | 7/2013 | Kneckt | H04W 72/0446 | 370/330 |
| 2014/0086153 A1* | 3/2014 | Bontu | H04W 4/005 | 370/329 |
| 2014/0087754 A1* | 3/2014 | Siomina | H04W 4/029 | 455/456.1 |
| 2014/0127991 A1* | 5/2014 | Lim | H04W 76/023 | 455/39 |
| 2014/0204847 A1* | 7/2014 | Belleschi | H04W 76/14 | 370/329 |
| 2014/0254429 A1* | 9/2014 | Wang | H04L 5/0037 | 370/254 |
| 2014/0269641 A1 | 9/2014 | Jang et al. | | |
| 2014/0302784 A1* | 10/2014 | Kim | H04W 8/005 | 455/41.2 |
| 2014/0315562 A1* | 10/2014 | Lim | H04W 8/005 | 455/450 |
| 2014/0349694 A1* | 11/2014 | Raghothaman | H04W 76/14 | 455/509 |
| 2014/0364079 A1* | 12/2014 | DiFazio | H04W 36/22 | 455/418 |
| 2014/0370904 A1* | 12/2014 | Smith | H04W 8/005 | 455/450 |
| 2015/0031353 A1* | 1/2015 | Hakola | H04W 48/16 | 455/422.1 |
| 2015/0071189 A1* | 3/2015 | Park | H04W 56/00 | 370/329 |
| 2015/0156165 A1* | 6/2015 | Lindoff | H04W 8/005 | 370/329 |
| 2015/0156619 A1* | 6/2015 | Fodor | H04W 8/005 | 455/434 |
| 2015/0181546 A1* | 6/2015 | Freda | H04L 5/0051 | 370/336 |
| 2015/0195823 A1* | 7/2015 | Seo | H04W 72/0406 | 370/329 |
| 2015/0223147 A1* | 8/2015 | Fujishiro | H04W 8/005 | 370/329 |
| 2015/0223257 A1* | 8/2015 | Wilhelmsson | H04W 76/023 | 455/452.1 |
| 2015/0305075 A1* | 10/2015 | Fodor | H04W 8/005 | 370/329 |
| 2015/0341971 A1* | 11/2015 | Fodor | H04W 76/14 | 370/280 |
| 2016/0050534 A1* | 2/2016 | Lim | H04W 64/00 | 370/252 |
| 2016/0234670 A1* | 8/2016 | Zhang | H04W 8/005 | |

FOREIGN PATENT DOCUMENTS

| | | | |
|---|---|---|---|
| WO | 2013/062351 A1 | 5/2013 | |
| WO | 2013/066126 A1 | 5/2013 | |

OTHER PUBLICATIONS

Written Opinion of the International Searching Authority issued in PCT/JP2014/068789 dated Sep. 9, 2014 (5 pages).
Extended European Search Report in counterpart European Application No. 14 82 5783.5 dated Jun. 23, 2016 (12 pages).
Qualcomm Incorporated; "Techniques for D2D Discovery"; 3GPP TSG-RAN WG1 #73, R1-132503; Fukuoka, Japan; May 20-24, 2013 (7 pages).
Office Action issued in counterpart Chinese Patent Application No. 201480040951.X, dated Jun. 27, 2018 (19 pages).
Office Action issued in the counterpart European Patent Application No. 14825783.5, dated Feb. 1, 2019 (8 pages).
Office Action issued in counterpart Chinese Patent Application No. 201480040951.X, dated Jan. 14, 2019 (19 Pages).
Office Action issued in counterpart Chinese Patent Application No. 201480040951.X, dated Jul. 8, 2019 (11 pages).
Office Action issued in counterpart Chinese Patent Application No. 201480040951.X, dated Apr. 29, 2020 (12 pages).

* cited by examiner

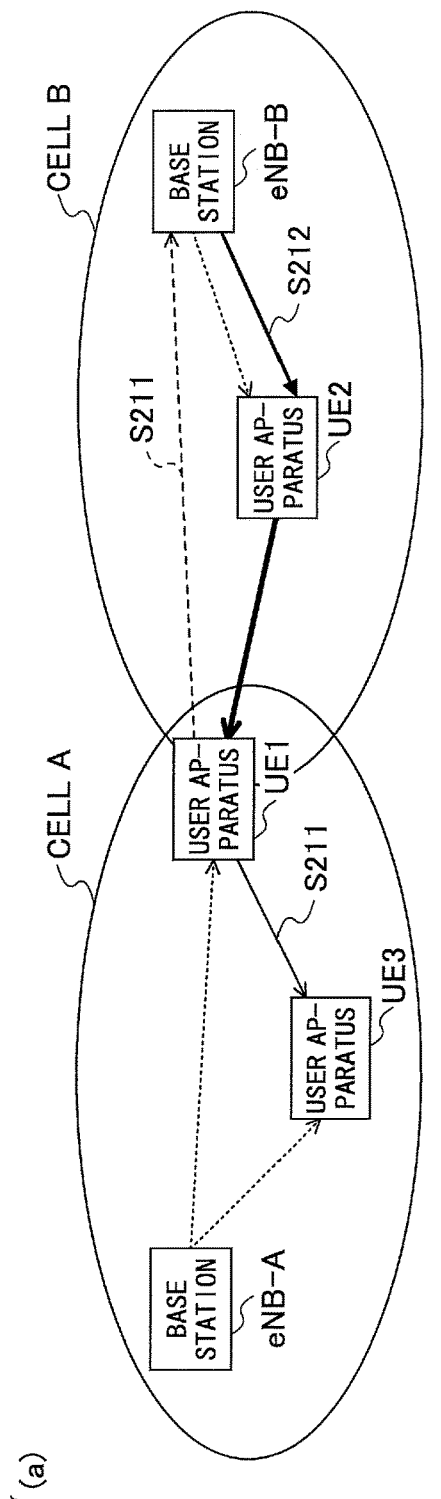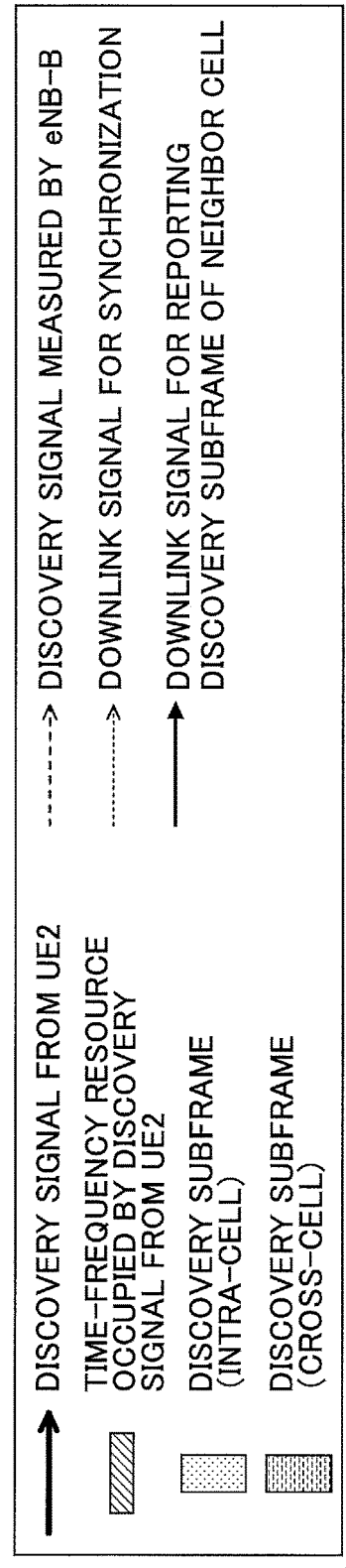
FIG.24

USER APPARATUS, BASE STATION, DISCOVERY SIGNAL RECEPTION METHOD AND DISCOVERY SIGNAL TRANSMISSION METHOD

TECHNICAL FIELD

The present invention relates to terminal-to-terminal (D2D) communication. More particularly, the present invention relates to a technique for transmitting and receiving a terminal discovery signal in an inter-cell asynchronous environment.

BACKGROUND ART

In a mobile communication system, it is common that a terminal (to be referred to as "user apparatus UE" hereinafter) and a base station eNB performs communication so that communication is performed between user apparatuses UE. However, in recent years, various techniques are considered on D2D communication (to be also referred to as device-to-device communication) for performing direct communication between user apparatuses UE.

When performing communication between user apparatuses UE, it is necessary that a user apparatus UE discovers another neighboring user apparatus UE. As a method for discovering a user apparatus UE, there is a method in which each user apparatus UE transmits (broadcasts) a discovery signal including its own ID (identification information). For example, as shown in FIG. 1, when a user apparatus UE-A transmits a discovery signal including its own identification information, and a user apparatus UE-B receives the discovery signal, the user apparatus UE-B discovers the user apparatus UE-A by determining that there is identification information of the user apparatus UE-A in the discovery signal.

FIG. 2 is a diagram showing an example of a radio resource (to be referred to as "resource" hereinafter) for transmitting a discovery signal. In the example of FIG. 2, it is defined that a discovery resource (example: discovery subframe), for performing discovery (and being discovered) of a user apparatus UE by transmitting and receiving a discovery signal, comes periodically. As shown in FIG. 2, a time length between a period (to be also referred to as discovery period) for transmitting and receiving a discovery signal and a next discovery signal is called a discovery signal interval. Such a discovery resource is assigned by, for example, a base station eNB of a radio access network (RAN), so that a user apparatus UE performs transmission and reception of a discovery signal by using a discovery resource at discovery signal intervals.

In the resource of each discovery period in FIG. 2, there are a plurality of blocks (each being a time-frequency resource block). For example, each user apparatus UE transmits a discovery signal by selecting a block from among the blocks, and receives a discovery signal by a block. In FIG. 2, the part other than the discovery period is used for normal communication via a base station eNB.

RELATED ART DOCUMENT

Patent Document

[PATENT DOCUMENT 1] JP2012-209893

SUMMARY OF THE INVENTION

Problem to be Solved by the Invention

Within a cell, synchronized transmission and reception of discovery signals are assumed. This is described with reference to FIG. 3. As shown in FIG. 3(a), in a case where each user apparatus UE1, UE2 exists in a network coverage (in a cell) as shown in FIG. 3(a), the user apparatus UE1, UE2 is synchronized with a base station eNB by a downlink signal from the base station eNB, and as a result, synchronization is established between user apparatuses UE.

By establishing synchronization between user apparatuses UE, since discovery periods (subframes in this example) recognized by the user apparatuses UE align as shown in FIG. 3(b), the user apparatus UE2 can properly receive a discovery signal transmitted by the user apparatus UE1. Accordingly, by synchronized discovery signal detection, discovery performance is improved, so that energy consumption can be suppressed.

Generally, in many cases, base stations eNB are not synchronized with each other in a mobile communication system such as LTE and the like, and when base stations are asynchronous, the user apparatuses UE are asynchronous between different cells.

A problem in an asynchronous environment is described with reference to FIG. 4. In FIG. 4, there are a base station eNB-A and a base station eNB-B that are asynchronous to each other, and it is assumed that a user apparatus UE1 synchronized with the base station eNB-A and a user apparatus UE2 synchronized with the base station eNB-B perform D2D communication.

In an environment shown in FIG. 4(a), in a case where a subframe 3 is defined as a subframe (discovery subframe) for discovery signal transmission and reception, as shown in FIG. 4(b), the user apparatus UE1 transmits a discovery signal in the subframe 3 of the own cell. However, the user apparatus UE1 is not synchronized with the user apparatus UE2, the time which the user apparatus UE1 recognizes as the subframe 3 is between subframes 0 and 2 for the user apparatus UE2, which is not a subframe 3. Thus, the user apparatus UE2 does not expect to receive a discovery signal at the time when the user apparatus UE1 recognizes as the subframe 3, so the user apparatus UE2 cannot receive a discovery signal transmitted from the user apparatus UE1.

The present invention is contrived in view of the abovementioned points, and an object of the present invention is to provide a technique that enables transmission and reception of a D2D communication discovery signal between asynchronous user apparatuses in an inter-cell asynchronous environment.

Means for Solving the Problem

According to an embodiment of the present invention, there is provided a user apparatus, for use in a radio communication system including a base station forming a cell, configured to receive a discovery signal of device-to-device communication, including:

an information reception unit configured to receive, from a base station of a residing cell, a resource range in which a discovery signal can be transmitted in a neighbor cell; and a discovery signal reception unit configured to receive a discovery signal at a time position that is synchronized with the neighbor cell in response to receiving a synchronization signal that is synchronized with the neighbor cell within the resource range received by the information reception unit.

According to an embodiment of the present invention, there is provided a user apparatus, for use in a radio communication system including a base station forming a cell, configured to receive a discovery signal of device-to-device communication, including:

a difference determination unit configured to determine a timing difference between a residing cell and a neighbor cell based on a downlink signal received from a base station of the residing cell and a downlink signal received from a base station of the neighbor cell;

an information transmission unit configured to transmit the timing difference determined by the difference determination unit to the base station of the residing cell; and a discovery signal reception unit configured to obtain a resource range in which a discovery signal can be transmitted in the neighbor cell based on the timing difference, and to receive a discovery signal at a time position synchronized with the neighbor cell in response to receiving a synchronization signal synchronized with the neighbor cell within the resource range.

According to an embodiment of the present invention, there is provided a user apparatus, for use in a radio communication system including a base station forming a cell, configured to transmit a discovery signal of device-to-device communication, including:

an information reception unit configured to receive, from a base station of a residing cell, a resource range in which a discovery signal can be received in a neighbor cell; and a discovery signal transmission unit configured to transmit a discovery signal at a time position that is synchronized with the neighbor cell in response to receiving a synchronization signal that is synchronized with the neighbor cell within the resource range received by the information reception unit.

According to an embodiment of the present invention, there is provided a user apparatus, for use in a radio communication system including a base station forming a cell, configured to transmit a discovery signal of device-to-device communication, including:

a difference determination unit configured to determine a timing difference between a residing cell and a neighbor cell based on a downlink signal received from a base station of the residing cell and a downlink signal received from a base station of the neighbor cell;

an information transmission unit configured to transmit the timing difference determined by the difference determination unit to the base station of the residing cell; and a discovery signal transmission unit configured to obtain a resource range in which a discovery signal can be received in the neighbor cell based on the timing difference, and to transmit a discovery signal at a time position synchronized with the neighbor cell in response to receiving a synchronization signal synchronized with the neighbor cell within the resource range.

According to an embodiment of the present invention, there is provided a base station, for use in a radio communication system, configured to communicate with a user apparatus that transmits and receives a discovery signal of device-to-device communication, including:

a resource range determination unit configured to receive a discovery signal from a user apparatus that resides in a neighbor cell, and to determine a resource range in which a discovery signal can be transmitted and received in the neighbor cell based on the discovery signal; and a resource range transmission unit configured to transmit a resource range determined by the resource range determination unit to a user apparatus that resides in a cell of the base station.

According to an embodiment of the present invention, there is provided a base station, for use in a radio communication system, configured to communicate with a user apparatus that transmits and receives a discovery signal of device-to-device communication, including:

a resource range determination unit configured to receive, from a user apparatus that resides in a cell of the base station, a timing difference between the cell and a neighbor cell, and to determine a resource range in which a discovery signal can be transmitted and received in the neighbor cell based on the timing difference; and a resource range transmission unit configured to transmit a resource range determined by the resource range determination unit to a user apparatus that resides in the cell of the base station.

Effect of the Present Invention

According to an embodiment of the present invention, there is provided a technique that enables transmission and reception of a D2D communication discovery signal between asynchronous user apparatuses in an inter-cell asynchronous environment.

BRIEF DESCRIPTION OF THE DRAWINGS

FIG. 24 is a diagram showing a concrete example of a first method in step 201;

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below.

Figure 1:
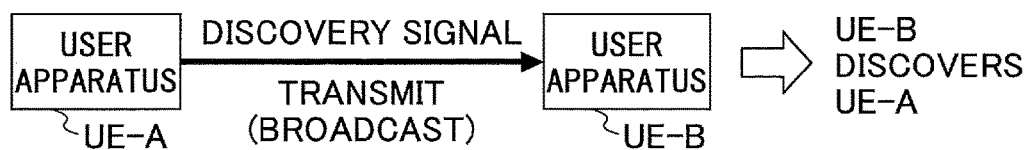
FIG. 1 is a diagram for explaining a technique for discovering a user apparatus UE by D2D communication.
Figure 2:
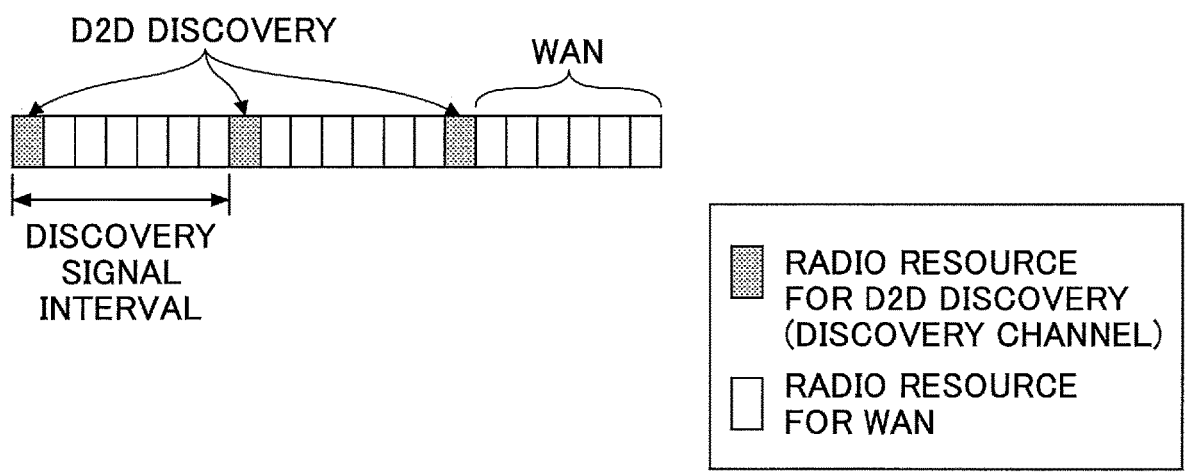
FIG. 2 is a diagram showing an example of discovery resources.
Figure 3:
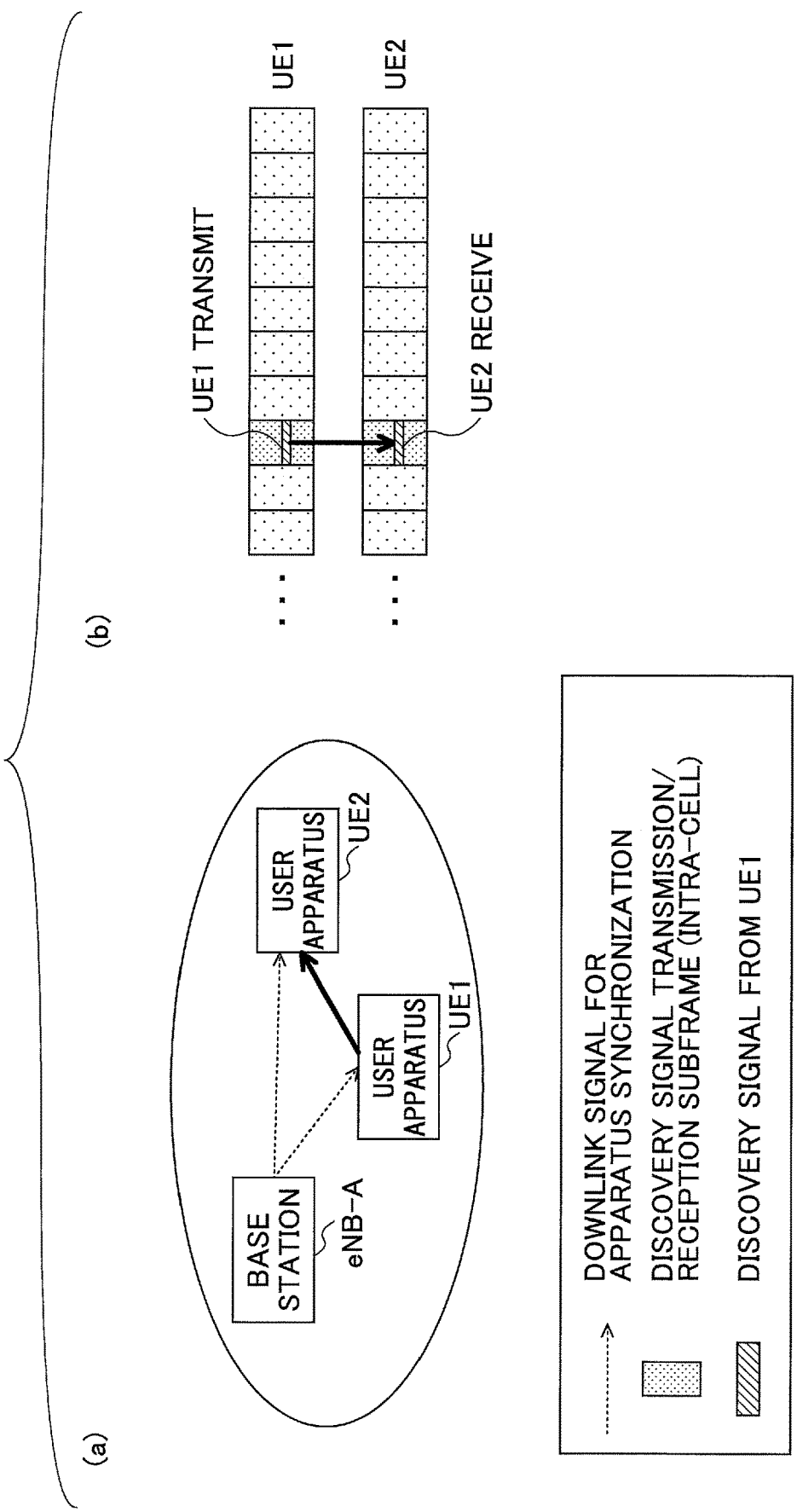
FIG. 3 is a diagram showing an example of D2D communication in a synchronized environment.
Figure 4:
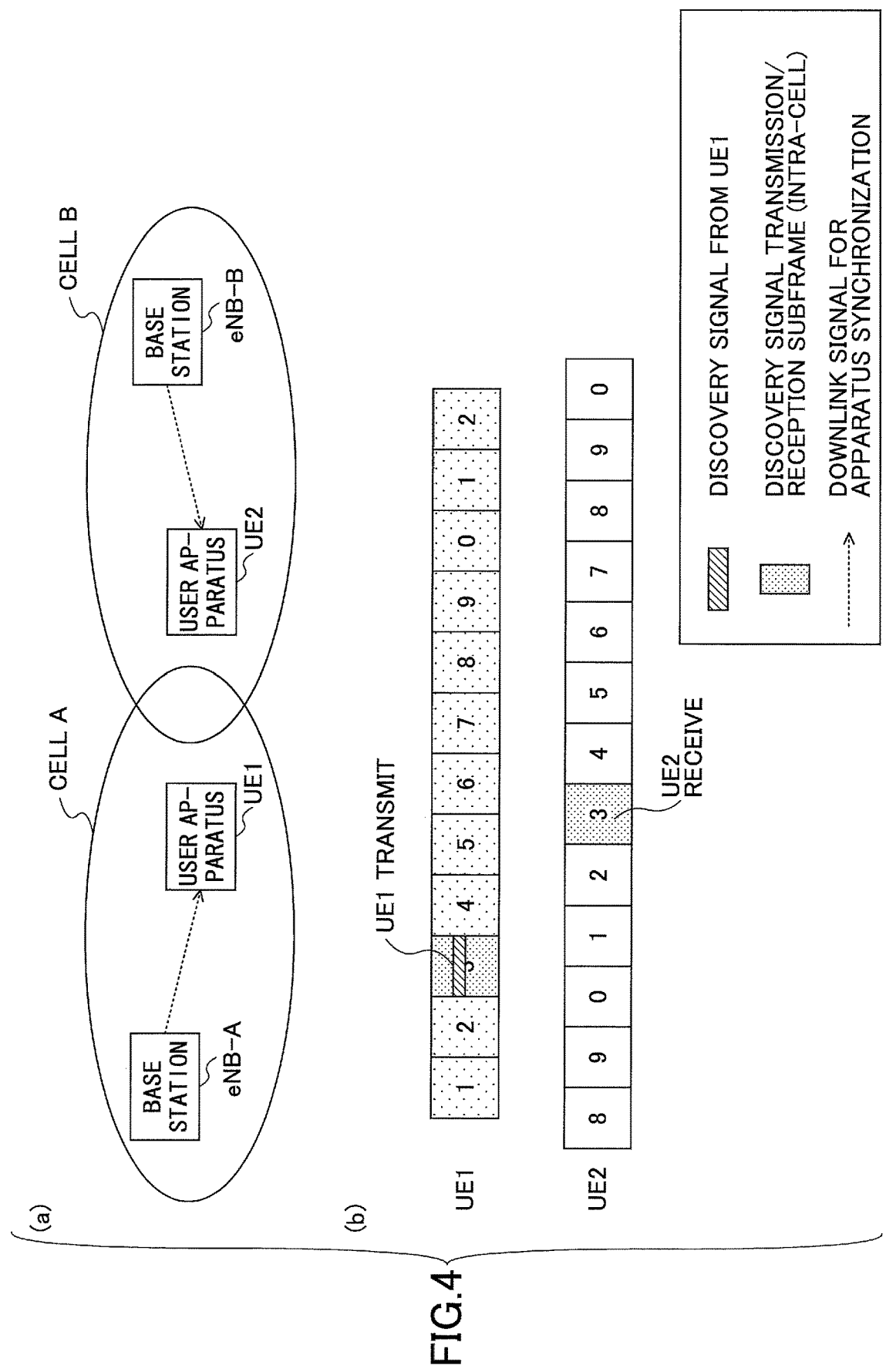
FIG. 4 is a diagram showing an example of D2D communication in an asynchronous environment.
Figure 5:
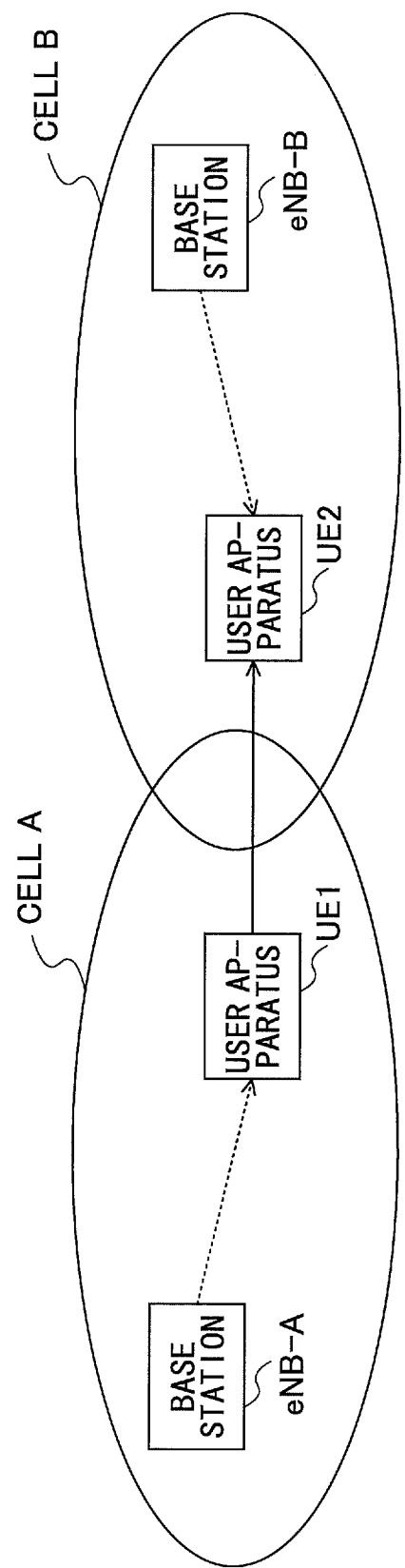
FIG. 5 is a whole configuration example of a system in an embodiment of the present invention.

FIG. 5 shows a whole configuration example of a system in an embodiment (common to first and second embodiments) of the present invention. As shown in FIG. 5, in the present embodiment, in an environment (assumed to be asynchronous) where there are a base station eNB-A and a base station eNB-B, a user apparatus UE (example: user apparatus UE1) in a cell A of the base station eNB-A and a user apparatus UE (example: user apparatus UE2) in a cell B of the base station eNB-B perform discovery signal transmission and reception for D2D communication.

The user apparatus UE1 in the cell A of the base station eNB-A is synchronized with the base station eNB-A, and the user apparatus UE2 in the cell B of the base station eNB-B is synchronized with the base station eNB-B. However, since the base station eNB-A is not synchronized with the base station eNB-B, the user apparatus UE1 is not synchronized with the user apparatus UE2.

Figure 6:
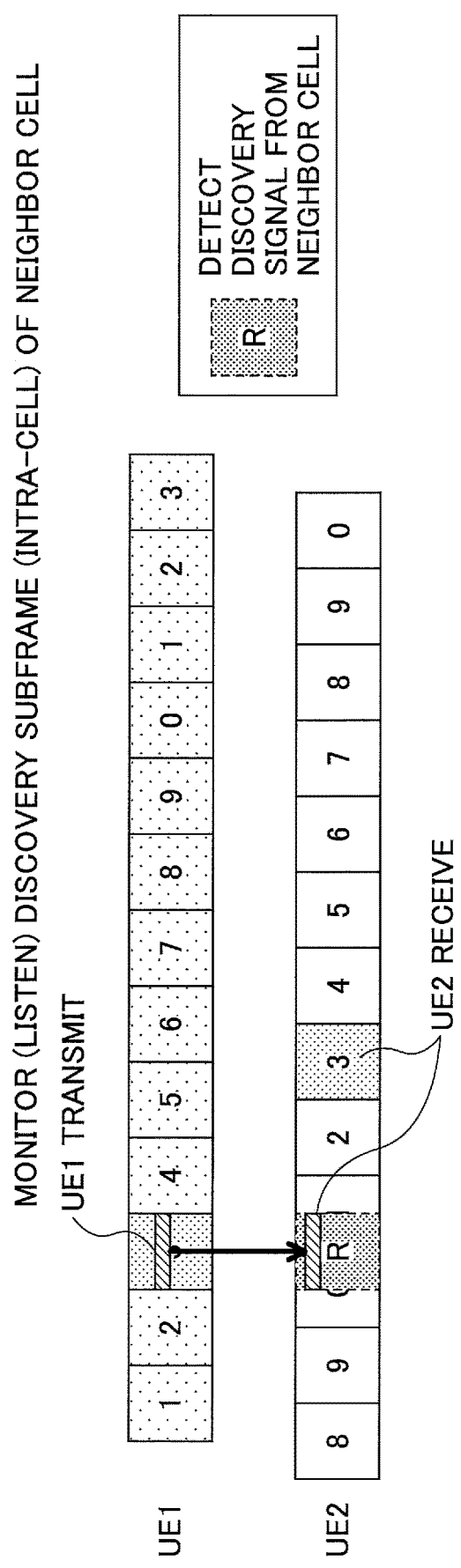
FIG. 6 is a diagram showing an outline of a first embodiment.

In such an environment, in the first embodiment of the present invention, as shown in FIG. 6, the user apparatus UE2 ascertains a time of a discovery period (discovery subframe) in the neighbor cell A (user apparatus UE1), and performs operation of receiving (listen) a discovery signal during the period.

Figure 7:
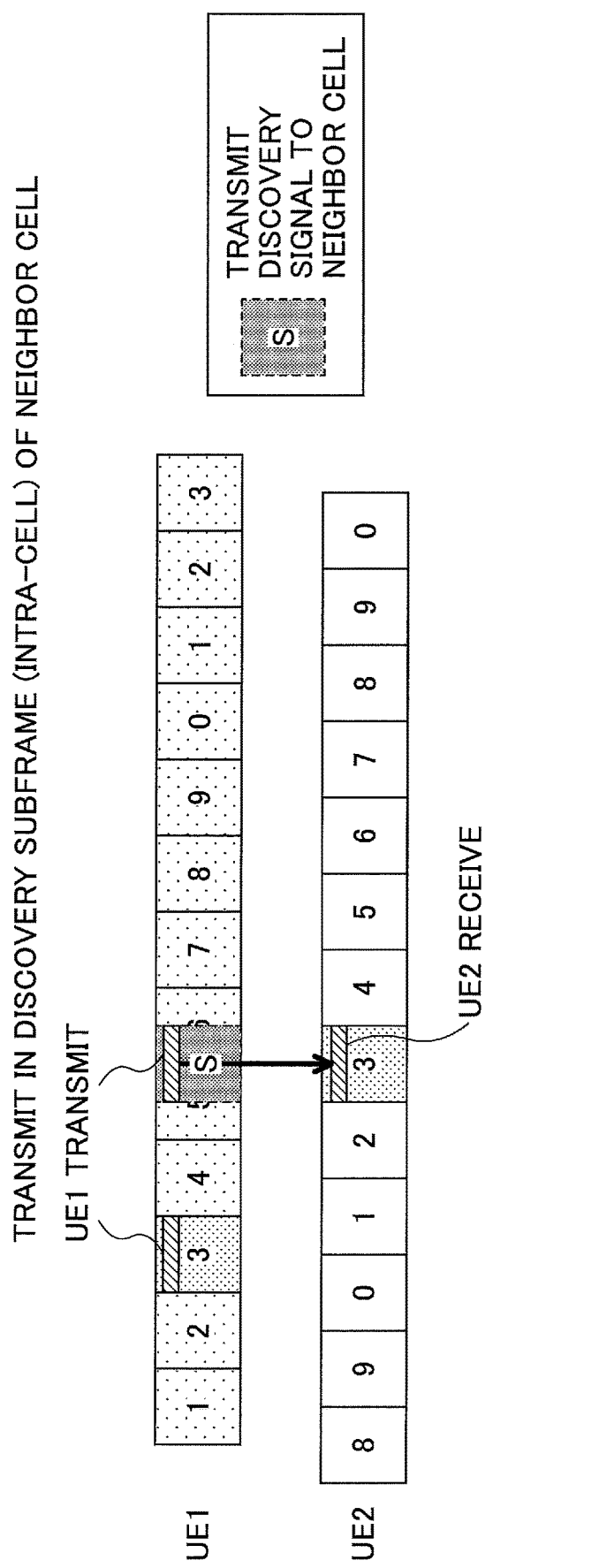
FIG. 7 is a diagram showing an outline of a second embodiment.

In the second embodiment, as shown in FIG. 7, the user apparatus UE1 ascertains a time of a discovery period (discovery subframe) of the neighbor cell (user apparatus UE2), and performs operation of transmitting a discovery signal during the period.

In the following, a first embodiment and a second embodiment are described. In the following, although "subframe" is used as a discovery period, this is merely an example. For example, the discovery period may be a plurality of subframes, or may be other periods.

Summary of the First Embodiment

Figure 8:
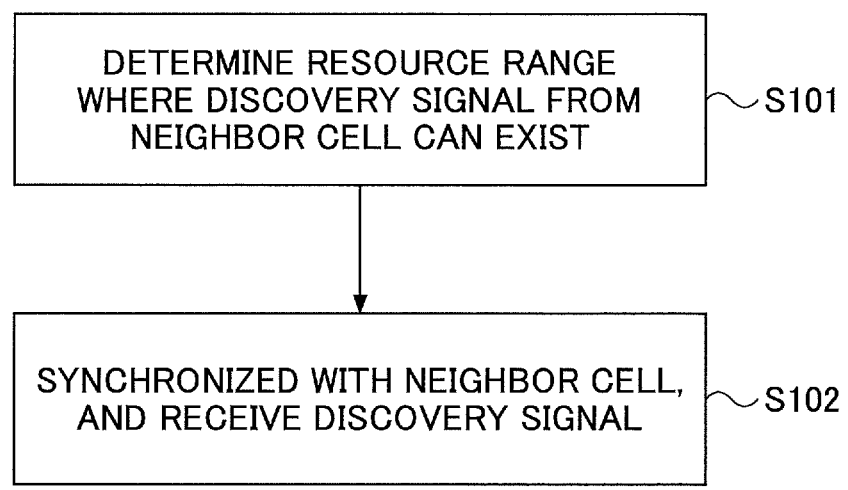
FIG. 8 is a flowchart showing an outline of a procedure of processing executed by a user apparatus UE in the side of receiving a discovery signal.

FIG. 8 is a flowchart showing a summary of a procedure of processes executed by a user apparatus UE in the discovery signal receiving side in the present embodiment.

Step 101) The user apparatus UE determines a (rough) resource range (example: time-frequency range, time range) where a discovery signal from a neighbor cell can exist. The "resource range" in step 101 (this is also the same in the after-mentioned step 201) is mainly a time range, but, the resource range may be a time-frequency range.

In the determination here, a signal received from a base station eNB (or a user apparatus UE) of the own cell is used. That is, the base station eNB (or the use apparatus UE) of the own cell determines a rough (approximate) resource range where a discovery signal from the neighbor cell can appear, and reports the resource range to the user apparatus UE at a timing of the base station eNB.

There are two types for the concrete method. In a first method the base station eNB observes a discovery signal transmitted from a neighbor cell, detects a resource range of the discovery signal in the neighbor cell based on the observation, and reports the information to user apparatuses UE under the base station eNB.

In a second method, a user apparatus UE at a cell edge receives a downlink signal from a base station eNB of a neighbor cell, detects a difference of subframe timing between the own cell and the neighbor cell, and reports the difference information to the base station eNB of the own cell. Then, the base station eNB reports the information of the difference to user apparatuses UE under the base station eNB. Accordingly, the user apparatus UE can ascertain the range of the discovery period in the neighbor cell.

Step 102) The user apparatus UE that receives the resource range where a discovery signal can be transmitted from the neighbor cell in step 101 establishes synchronization with the timing of the neighbor cell in the range, so as to receive (detect) a discovery signal transmitted from the user apparatus UE of the neighbor cell.

In order to establish synchronization with the neighbor cell, the user apparatus UE receives a synchronization signal from the neighbor cell. As concrete methods for it, there are three types. In a first method, the user apparatus UE receives a synchronization signal transmitted from a base station eNB of the neighbor cell. In a second method, the user apparatus UE receives a synchronization signal from a selected user apparatus UE (anchor UE) in the neighbor cell. In a third method, the user apparatus UE receives a synchronization signal from a user apparatus UE that transmits a discovery signal in the neighbor cell. That is, the user apparatus UE of the neighbor cell transmits a discovery signal together with a synchronization signal.

In the following, a first embodiment is described in detail.

[Step 101: The User Apparatus UE Ascertains a Resource Range where a Discovery Signal from a Neighbor Cell can be Transmitted]

<First Method in Step 101>

First, details of the first method in step 101 are described. As described before, in the first method, the base station eNB observes a discovery signal transmitted from a neighbor cell, detects a rough resource range (example: time-frequency range, time range) of discovery signal transmission in the neighbor cell based on the observation, and reports a signal including the information to user apparatuses UE under the base station eNB.

The signal that the base station eNB reports to the user apparatus UE under the base station eNB includes, for example, an absolute time-frequency range, an absolute time range, or information of difference with respect to a discovery resource position in the own cell, or the like. Although there is no limitation for the method of reporting the signal, the signal can be reported by, for example, broadcast signaling such as notification information, RRC signaling, (E)PDCCH signaling and the like. Also, combinations of these may be used.

Figure 9:
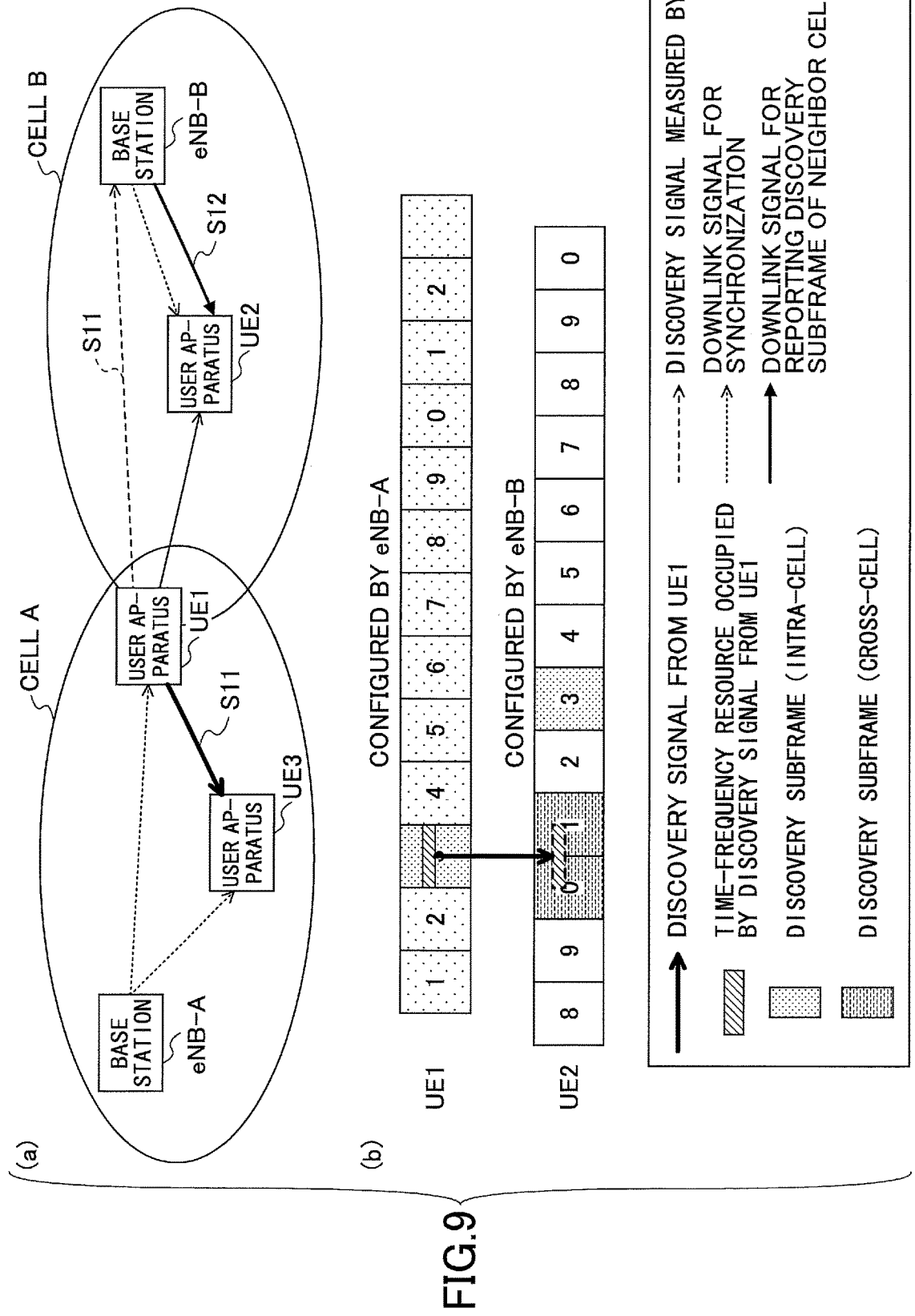
FIG. 9 is a diagram showing a concrete example of a first method in step 101.

A concrete example in the first method is described with reference to FIGS. 9(a) and (b). In this example, as shown in FIG. 9(a), the user apparatus UE1 and the user apparatus UE3 reside in a cell A, and the user apparatus UE2 resides in a cell B. In this system, in each cell, a subframe 3 is assigned as a subframe for discovery signal transmission and reception. Also, in the following example, although a time range is especially focused on as a resource range, the base station eNB may also ascertain a frequency range (band range) of a discovery resource in the neighbor cell based on a received discovery signal so as to report frequency difference (or neighbor cell use frequency) together with the time difference.

As shown in FIG. 9(a), the position of the user apparatus UE1 is a cell edge of the cell A, and also is a cell edge of the cell B. The user apparatus UE1 transmits a discovery signal in the subframe 3, so that the discovery signal is received by the user apparatus UE3, and is received by the base station eNB-B of the cell B (step 11).

The base station eNB-B that receives the discovery signal determines that a discovery signal in the neighbor cell A is transmitted at subframes 0 and 1 in the timing of the base station eNB-B, so that the base station eNB-B reports, to the user apparatus UE2 under the own base station, that a discovery subframe in the neighbor cell is within a range of the subframes 0 and 1 in the own base station (step 12).

As shown in FIG. 9(b), the user apparatus UE2 that receives the report determines to monitor (listen) a discovery signal from the neighbor cell A in the subframes 0 and 1. As described later, the user apparatus UE2 receives a synchronization signal during the monitoring period, and receives (detects) a discovery signal.

The user apparatus UE (example: the above-mentioned user apparatus UE2) that receives the report from the own base station eNB may always monitor a discovery signal from the neighbor cell, or may monitor it only when a predetermined condition is satisfied.

In the latter case, for example, the user apparatus UE determines to monitor a discover signal from the neighbor cell based on reference signals from the residing base station eNB and the neighbor base station eNB. For example, the user apparatus UE determines to monitor a discovery signal from the neighbor cell when a power of the reference signal from the neighbor base station eNB is larger than a predetermined threshold, and a power of the reference signal from the residing base station eNB is smaller than a predetermined threshold. The thresholds can be properly updated by a downlink signal from the residing base station eNB, for example. The downlink signal is reported by broadcast signaling, (e)PDCCH, RRC signaling and the like. Also, the residing base station eNB or the neighbor base station eNB may directly instruct the user apparatus UE to monitor a discovery signal of the neighbor cell.

The above-mentioned method in which the user apparatus UE determines whether to monitor a discovery signal from a neighbor cell is also applied to examples of other methods.

<Second Method in Step 101>

Next, a second method in step 101 is described in detail. As described before, in the second method, a user apparatus UE at a cell edge receives a downlink signal from a base station eNB of a neighbor cell, so that the user apparatus UE detects timing difference of subframe between the own cell and the neighbor cell, and reports the information of the difference to a base station eNB of the own cell. Then, the base station eNB reports the information of the difference to user apparatuses UE under the base station eNB.

Also, the base station eNB reports the timing difference to a neighbor base station eNB using a backhaul circuit (example: X2 interface). Then, the neighbor base station eNB that receives the information reports, to user apparatuses US under the neighbor base station eNB, a range where a discovery signal from a neighbor cell should be monitored. The report information may be absolute information or may a difference of a discovery resource position with respect to the own base station. Also, the information is transmitted by, for example, broadcast signaling, RRC signaling, (e)PDCCH signaling, or a combination of these.

For example, a signaling from the base station eNB of the neighbor cell may be used as a trigger for the user apparatus UE at the cell edge to measure a downlink signal of the base station eNB of the neighbor cell and to report the difference.

Also, the measurement and the report may be triggered by an event such as satisfaction of a condition, and the like. The event may be, for example, that a power of a discovery signal from a neighbor cell becomes greater than a predetermined threshold, and the like.

Also, similarly to the first method, the user apparatus UE that receives the report of the resource range of the discovery signal from the neighbor cell determines whether to monitor a discovery signal from the neighbor cell by itself or by being instructed from the base station eNB.

Next, concrete examples of the second method are described with reference to FIGS. 10(a) and (b). As shown in FIG. 10(a), in this example, a user apparatus UE1 and a user apparatus UE3 reside in a cell A, and a user apparatus UE2 resides in a cell B. Also, in this system, a subframe 3 is assigned in each cell as a subframe for transmitting and receiving a discovery signal. Also in the following example, although explanation is given by especially focusing on a time range as a resource range of a discovery signal in the neighbor cell, the user apparatus UE may ascertain a frequency range (band range) of a discovery resource of a neighbor cell based on downlink signals from the residing base station eNB and the neighbor base station eNB, so as to report, to the residing base station eNB, a neighbor cell use frequency or a frequency difference together with the time difference.

As shown in FIG. 10(a), the position of the user apparatus UE1 is a cell edge of the cell A and also is a cell edge of the cell B. The user apparatus UE1 receives a downlink signal from the base station eNB-A, and also receives a downlink signal from the base station eNB-B (step 21).

The user apparatus UE1 estimates a timing difference (about 2.5 subframes in this example) between the base station eNB-A and the base station eNB-B based on a downlink signal from the base station eNB-A and a downlink signal from the base station eNB-B. The user apparatus UE1 transmits, to the base station eNB-A, information indicating that the cell A is faster than the cell B by about 2.5 subframes (step 22).

The base station eNB-A that receives the information reports, to the base station eNB-B, difference information of the timing by using a backhaul circuit (step 23). Also, the base station eNB-A reports, to the user apparatus UE3 under the base station eNB-A, subframes 5 and 6 corresponding to a time position that is delayed by 2.5 subframes with respect to the subframe 3 as a resource range of discovery subframes in the neighbor cell B (step 24). Accordingly, by performing notification using the backhaul circuit, the base station eNB-B can obtain timing information of a neighbor cell efficiently.

Also, the base station eNB-B reports, to the user apparatus UE2 under the base station eNB-B, subframes 0 and 1 corresponding to a time position that is advanced by 2.5 subframes with respect to the subframe 3 as a resource range of discovery subframes in the neighbor cell A (step 25).

Figure 10:
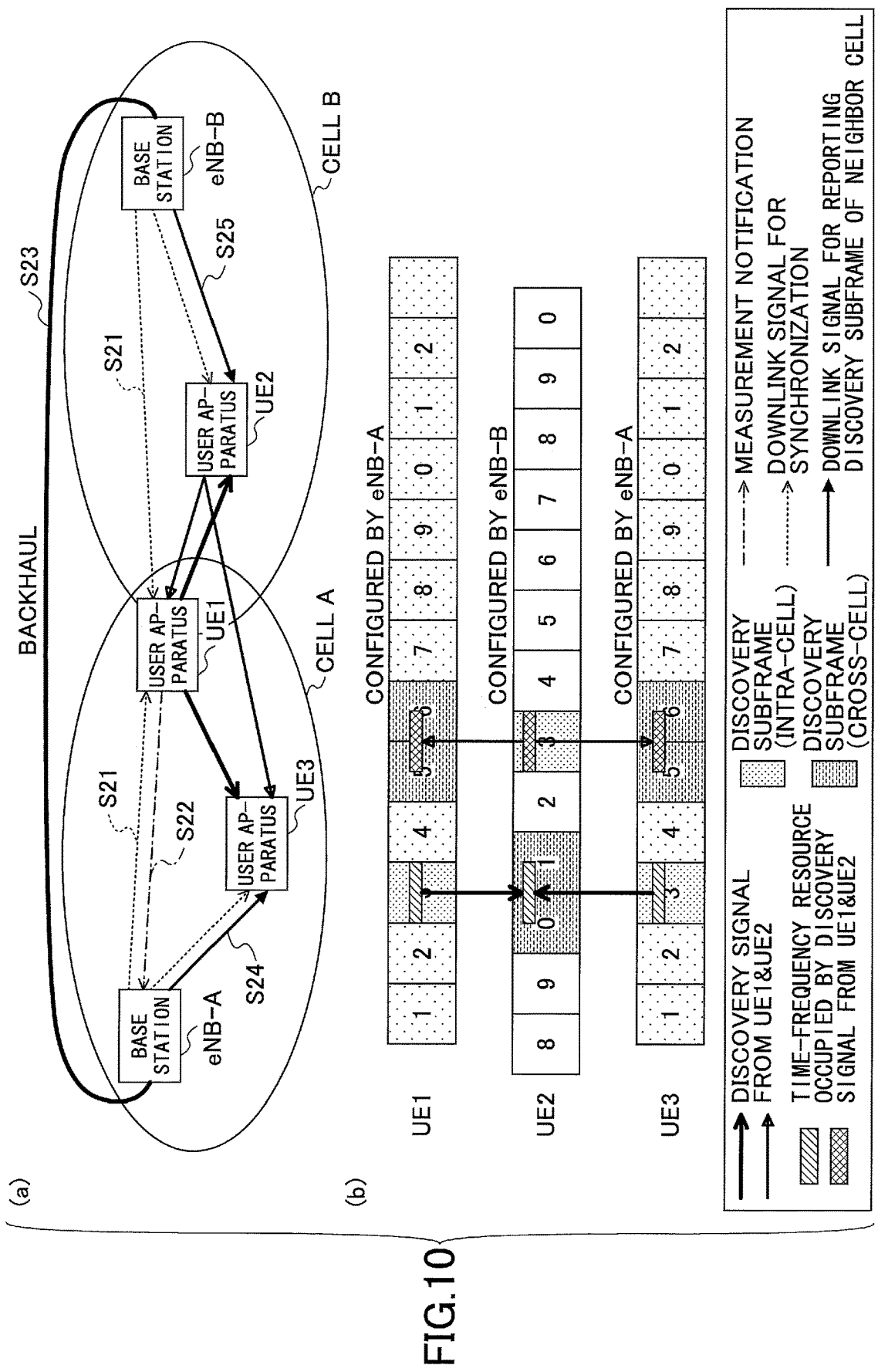
FIG. 10 is a diagram showing a concrete example of a second method in step 101.

Then, as shown in FIG. 10(*b*), the user apparatuses UE1 and UE3 of the cell A monitors a discovery signal from the neighbor cell B (user apparatus UE2) at subframes 5 and 6 including the time position of the discovery subframe of the neighbor cell B. Also, the user apparatus UE2 of the cell B monitors a discovery signal from the neighbor cell A (user apparatuses UE1 and UE3) at subframes 0 and 1 including the time position of the discovery subframe of the neighbor cell A.

In the following, procedure examples of measurement and reporting executed by a user apparatus UE at a cell edge in the second method are described.

Example 1

Figure 11:
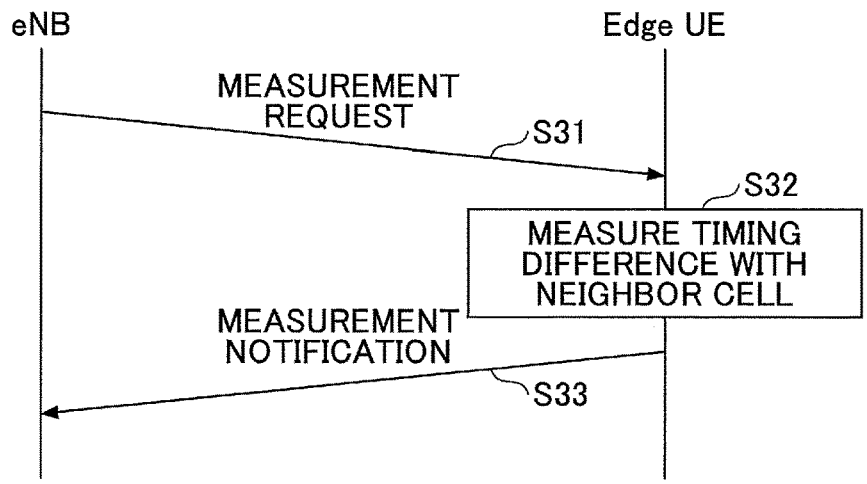
FIG. 11 is a procedure example 1 of measurement and reporting executed by a user apparatus UE at a cell edge in a second method.

A Procedure in the example 1 is described with reference to FIG. 11. In the example 1, execution of measurement and reporting is triggered by a signaling from the residing base station eNB. That is, as shown in FIG. 11, the base station eNB transmits a measurement request to a user apparatus at a cell edge (step 31). The user apparatus UE measures a timing difference between the neighbor cell and the residing cell based on the measurement request (step 32), and transmits the timing difference to the base station eNB as a measurement report (step 33).

Example 2

A procedure example of the example 2 is described with reference to FIG. 12. In the example 2, execution of measurement and reporting is triggered by a predetermined event. In the example shown in FIG. 12, the base station eNB transmits a threshold to a user apparatus UE at the cell edge (step 41). The user apparatus UE compares a power of a downlink signal of the neighbor cell with a threshold (step 42), and measures a timing difference between the neighbor cell and the residing cell when the power of the downlink signal of the neighbor cell is greater than the threshold (step 43), and the user apparatus UE transmits the timing difference to the base station eNB as a measurement report (step 44).

A procedure example of transmission and reception of the timing difference using a backhaul circuit (example: X2 interface) between base stations is described with reference to FIG. 13. The base station eNB1 transmits a D2D discovery negotiation request to the base station eNB2 (step 51). The base station eNB2 that receives the D2D discovery negotiation request transmits a D2D discovery negotiation response to the base station eNB1 (step 52). Information of a timing difference received from the user apparatus UE under the base station eNB2 is included in the D2D discovery negotiation response. Also, information of a timing difference received from the user apparatus UE under the base station eNB1 may be included in the D2D discovery negotiation request.

<Modified Example of Second Method>

The user apparatus UE at the cell edge may transmit (broadcast) a timing difference estimation result to surrounding user apparatuses UE by a discovery signal. This process can be performed, for example, in a case where the user apparatus UE cannot communicate with the base station eNB or process amount for communication is required since the user apparatus UE is in an RRC idle state.

The discovery signal transmitted by the user apparatus UE at the cell edge in this case includes information of the timing difference. For example, the information is configured such that a message segment of 4 bits indicates the number of subframes of the timing difference (offset). As an example, 0011 indicates a timing difference of 3 subframes.

Also, for example, a message segment of 2 bits indicates the number of subframes (length of a period) during which a discovery signal from a neighbor cell should be monitored. As an example, 10 indicates to monitor a discovery signal from a neighbor cell for 2 subframes.

In this example, when a surrounding user apparatus UE receives a discovery signal including timing difference information, the user apparatus UE includes the timing difference information into a discovery signal of itself, and transmits the discovery signal.

Figure 14:
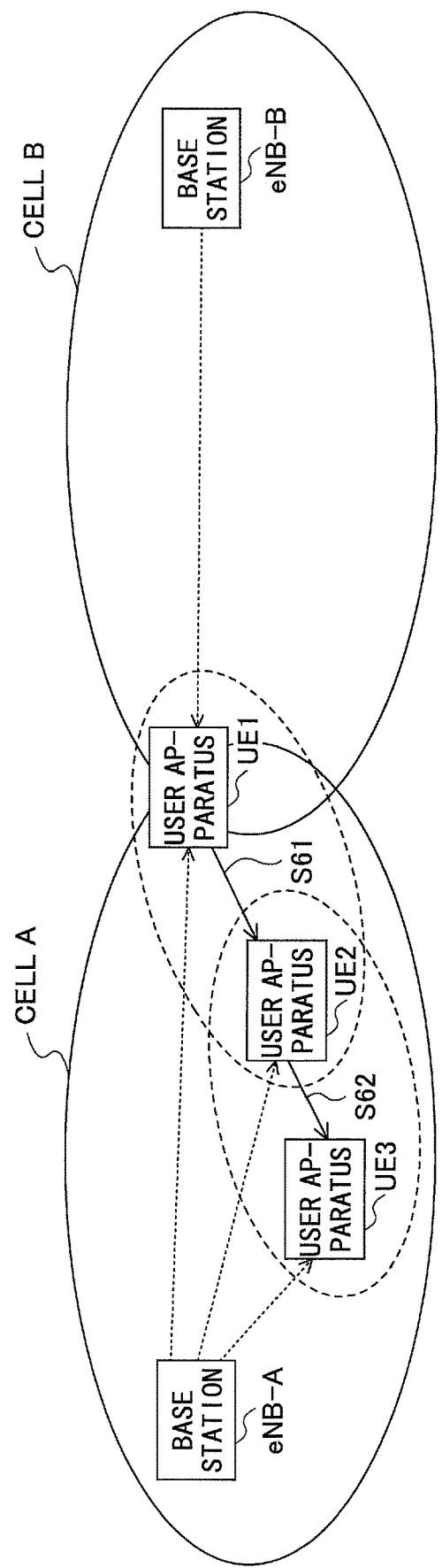
FIG. 14 is a diagram showing a modified example of the second method.

Also, the base station eNB may transmit a threshold for the user apparatus UE to determine whether to transmit timing difference information by a discovery signal to surrounding user apparatuses UE. In this case, only when a power of a downlink signal from the base station eNB is smaller than the threshold (when the user apparatus UE is in a cell edge), the user apparatus UE transmits a discovery signal including timing difference information to surrounding user apparatuses UE. This example is shown in FIG. 14. In FIG. 14, the power of the downlink signal from the base station eNB at the user apparatus UE1 and the user apparatus UE2 is smaller than the threshold. Thus, the user apparatus UE2 receives timing difference information, included in a discovery signal, transmitted from the user apparatus UE1 (step 61), the user apparatus UE2 includes the information in a discovery signal, and transfers the discovery signal to the user apparatus UE3 (step 62).

The surrounding user apparatus UE that receives the timing difference information determines whether to monitor a discovery signal from a neighbor cell based on determination of the user apparatus UE itself or based on an instruction from the base station eNB.

Figure 15:
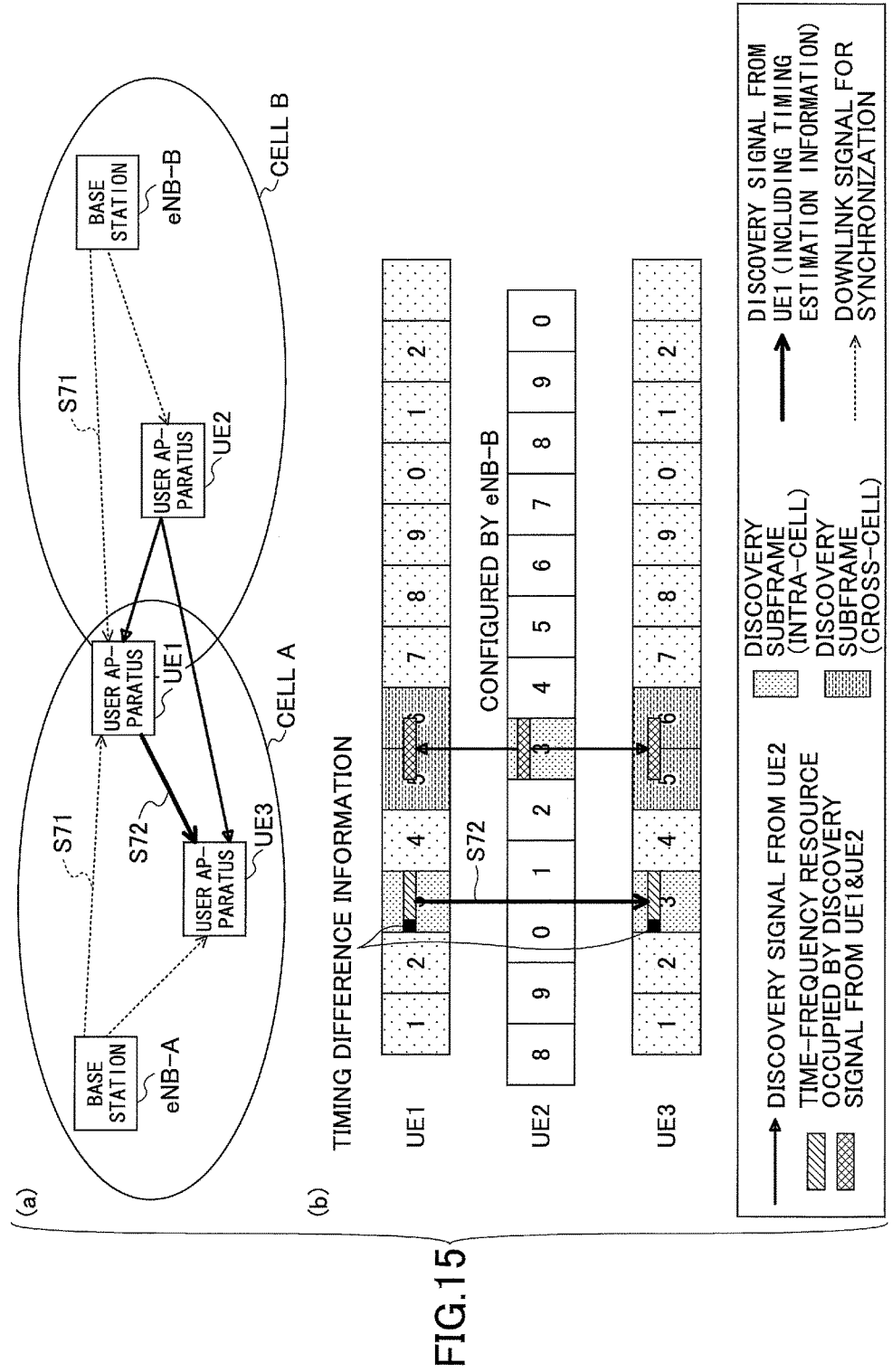
FIG. 15 is a diagram showing a concrete example of a modified example of the second method.

Next, a concrete example in a modified example is described with reference to FIGS. 15(*a*) and (*b*). As shown in FIG. 15(*a*), in this example, the user apparatus UE1 and the user apparatus UE3 reside in the cell A, and the user apparatus UE2 resides in the cell B. Also, in this system, a subframe 3 is assigned in each cell as a subframe for transmitting and receiving a discovery signal.

The position of the user apparatus UE1 is a cell edge of the cell A and also is a cell edge of the cell B. The user apparatus UE1 receives a downlink signal from the base station eNB-A, and also receives a downlink signal from the base station eNB-B (step 71).

The user apparatus UE1 estimates a timing difference (about 2.5 subframes in this example) between the base station eNB-A and the base station eNB-B based on a downlink signal from the base station eNB-A and a downlink signal from the base station eNB-B. The user apparatus UE1 transmits a discovery signal including information indicating that the cell A is faster than the cell B by about 2.5 subframes (step 72).

The discovery signal including the timing difference information transmitted from the user apparatus UE1 is received by the user apparatus UE3 in the same cell. Then, the user apparatus UE3 learns that a discovery subframe in the neighbor cell B is within a range of subframes 5 and 6. Accordingly, the user apparatuses UE1 and UE3 can monitor a discovery signal from the neighbor cell B at the subframes 5 and 6.

As mentioned above, since the range for monitoring a synchronization signal and a discovery signal is restricted in step 101, the user apparatus UE can receive a discovery signal from a neighbor cell efficiently even in an asynchronous environment.

[Step 102: The User Apparatus UE Establishes Synchronization with a Neighbor Cell]

In step 102, the user apparatus UE monitors a discovery signal from a user apparatus UE of a neighbor cell within a monitoring resource range, of a neighbor cell discovery signal, reported in step 101. In the monitoring, the user apparatus UE receives a synchronization signal, establishes synchronization with the neighbor cell, and receives (detects) a discovery signal at an accurate timing. As described before, there are three types of methods for transmitting and receiving a synchronization signal. In the following, first to third methods in step 102 are described in detail.

The synchronization signal in this example is, for example, a signal having a predetermined pattern. When a user apparatus UE detects reception of a synchronization signal (predetermined pattern), the user apparatus UE determines that a discovery subframe comes after a predetermined time (after-mentioned T), so that the user apparatus UE can perform operation for decoding the discovery signal at the discovery subframe, for example. Also, the synchronization signal may include the time T or information of a discovery resource (time-frequency resource). These features similarly apply to the second embodiment.

<First Method in Step 102>

In the first method, the user apparatus UE establishes synchronization with a neighbor cell by receiving a downlink signal (synchronization signal) of a base station eNB of the neighbor cell, and detects a discovery signal from the neighbor cell. That is, in the first method, a synchronization signal for synchronization in the user apparatus UE is transmitted from the neighbor base station eNB.

A predetermined time T is defined as a time between a discovery subframe and the synchronization signal. Thus, the user apparatus UE that receives the synchronization signal from the neighbor base station eNB can ascertain that a discovery subframe of the neighbor cell starts after the time T, and can receive (detect) a discovery signal accurately.

The synchronization signal transmitted from the neighbor base station eNB may be an existing downlink signal such as PSS/SSS and the like, or may be a signal newly defined for D2D synchronization of the neighbor cell.

Figure 16:
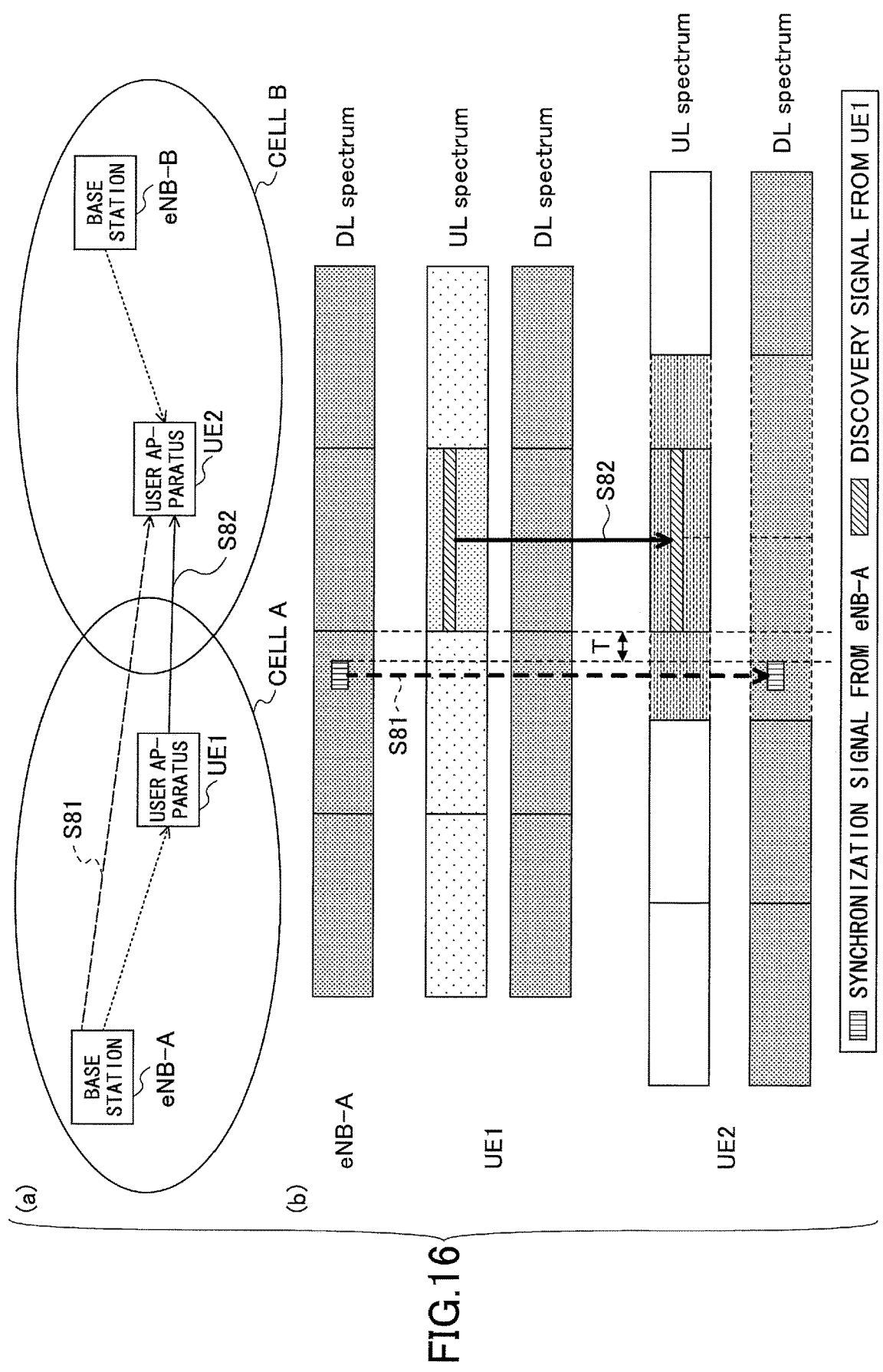
FIG. 16 is a diagram showing a concrete example of a first method of step 102.

A concrete example is described with reference to FIGS. 16(*a*) and (*b*). As shown in FIGS. 16(*a*) and (*b*), in this example, the base station eNB-A transmits a synchronization signal by a downlink band (DL spectrum) (step 81). The user apparatus UE2 that exists in the cell B establishes synchronization with the neighbor cell A by receiving the synchronization signal from the base station eNB-A. That is, the user apparatus UE2 establishes synchronization with the base station eNB-A and the user apparatus UE1. Reception of the synchronization signal is performed by non-coherent detection, for example.

By receiving the synchronization signal, the user apparatus UE2 can determine a resource position (although this is a time-frequency position, the present example especially focuses on a time position) of a discovery signal transmitted from the user apparatus UE1 of the neighbor cell, and can detect a discovery signal from the user apparatus UE1 (step 82). Here, coherent detection is possible.

The synchronization signal may exist in a discovery subframe in the cell (intra-cell) where the synchronization signal is transmitted, or may not exist in the discovery subframe. The example shown in FIG. 16 is an example where the synchronization signal is not in the discovery subframe.

<Second Method of Step 102>

In the second method, a synchronization signal is transmitted from a particular user apparatus UE (to be referred to as anchor UE) to a user apparatus UE of a neighbor cell, and the user apparatus UE establishes synchronization with the neighbor cell and detects a discovery signal from the neighbor cell. The anchor UE is synchronized with the base station eNB of the cell. Also, the anchor UE may be a user apparatus UE selected by the base station eNB, or may be a predetermined user apparatus placed in a distributed manner.

Similarly to the first method, a predetermined time T is defined as a time between a discovery subframe and the synchronization signal. Thus, the user apparatus UE that receives the synchronization signal from the anchor UE can ascertain that a discovery subframe of the neighbor cell starts after the time T, and can receive a discovery signal accurately.

The synchronization signal transmitted from anchor UE may be an existing downlink signal such as PSS/SSS and the like, or may be a signal newly defined for D2D synchronization of the neighbor cell. Also, for the synchronization signal, scheduling is performed for the anchor UE such that the synchronization signal does not interfere with normal cellular communication.

Figure 17:
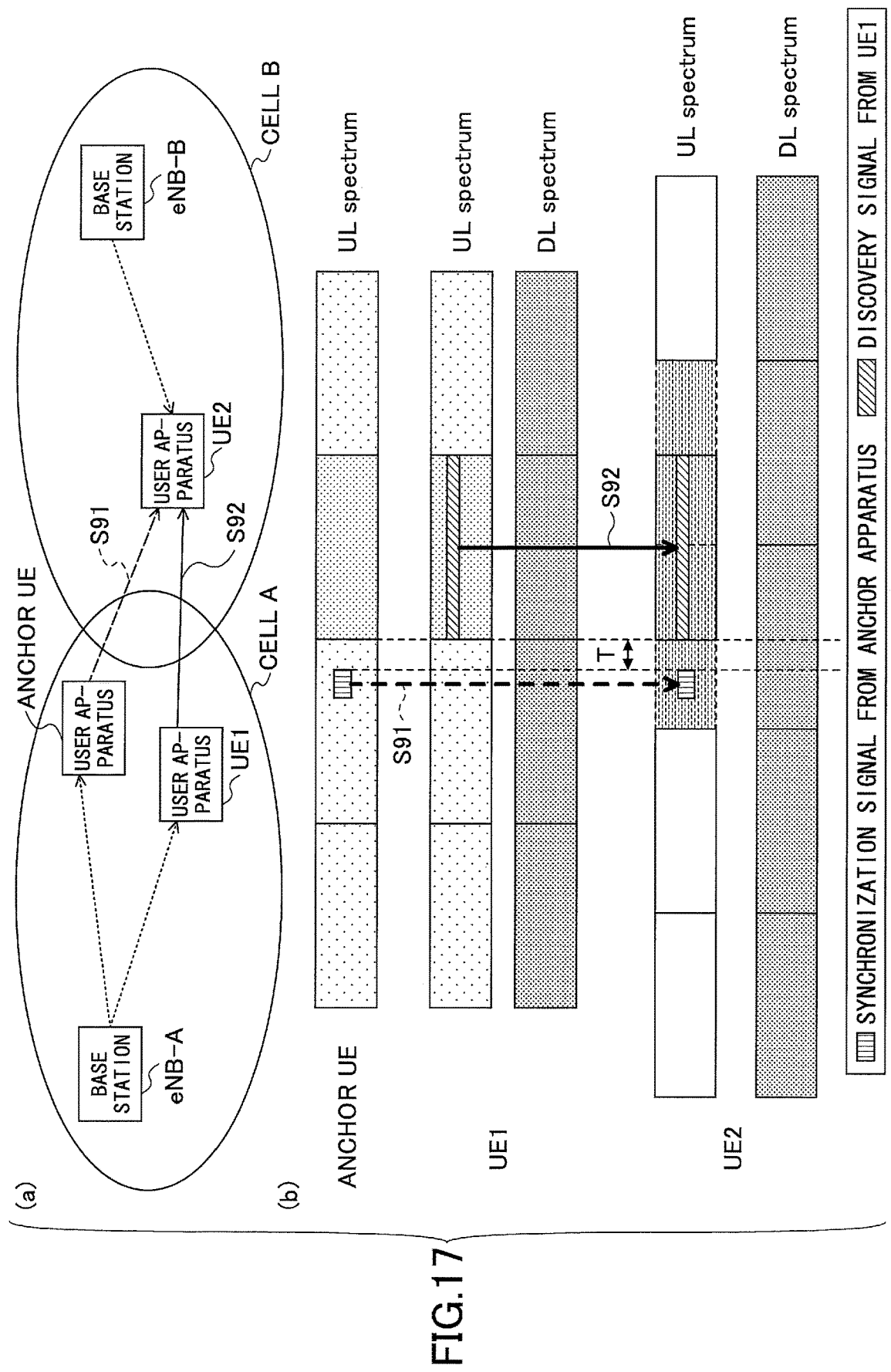
FIG. 17 is a diagram showing a concrete example of a second method of step 102.

A concrete example is described with reference to FIGS. 17(*a*) and (*b*). As shown in FIGS. 17(*a*) and (*b*), in this example, the anchor UE residing in the cell A transmits a synchronization signal using an uplink band (UL spectrum) (step 91). The user apparatus UE2 existing in the neighbor cell establishes synchronization with the neighbor cell A by receiving the synchronization signal from the anchor UE. That is, the user apparatus UE2 establishes synchronization with the anchor UE and the user apparatus UE1.

By receiving the synchronization signal, the user apparatus UE2 can ascertain a resource (this example focuses on time position) of a discovery signal transmitted from the user apparatus UE1 of the neighbor cell, so that the user apparatus UE2 can detect a discovery signal from the user apparatus UE1 (step 92).

The synchronization signal may exist in a discovery subframe in the cell (intra-cell) where the synchronization signal is transmitted, or may not exist in the discovery subframe. The example shown in FIG. 17 is an example where the synchronization signal is not in the discovery subframe.

<Third Method of Step 102>

In the third method, the user apparatus UE transmits a synchronization signal together with a discovery signal. A user apparatus UE of a neighbor cell that receives these signals detects the synchronization signal first, and next, detects the discovery signal.

The synchronization signal that is transmitted from the user apparatus UE together with the discovery signal may be an existing signal such as PSS/SSS and the like, or may be a new signal for D2D synchronization. Also, a plurality of user apparatuses UE may transmit the same synchronization signal or may transmit different synchronization signals. In the different synchronization signals, for example, the content (pattern and the like) is different between synchronization signals.

Also, the plurality of user apparatuses UE may transmit the synchronization signal by the same time-frequency resource, or may transmit the synchronization signal by different (with no interference to each other, that is, orthogonal) time-frequency resources.

Figure 18:
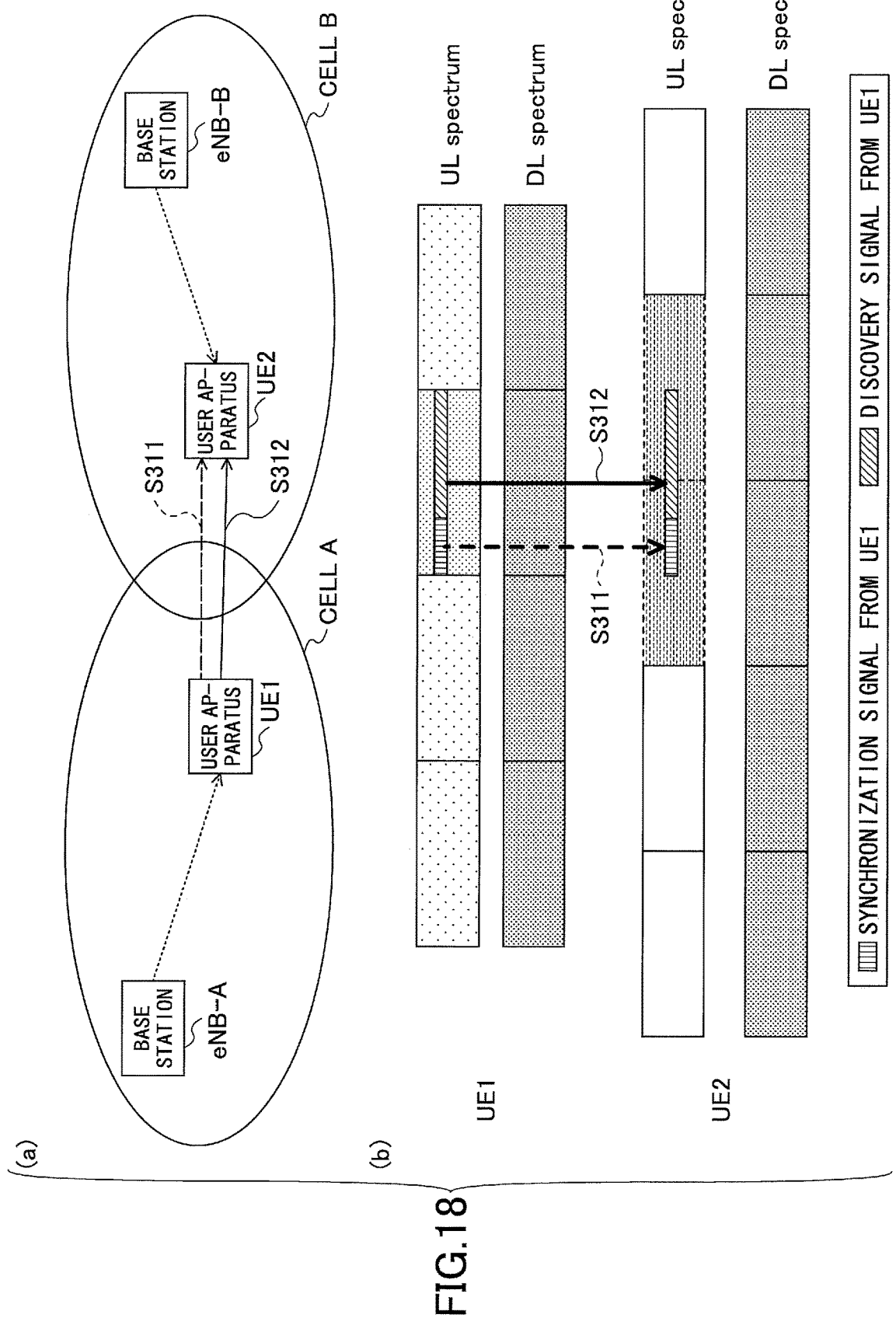
FIG. 18 is a diagram showing a concrete example of a third method of step 102.

A concrete example is describe with reference to FIGS. 18(*a*) and (*b*). As shown in FIGS. 18(*a*) and (*b*), in this example, the user apparatus UE1 residing in the cell A transmits a synchronization signal together with a discovery signal using an uplink band (UL spectrum) (step 311, 312). The user apparatus UE2 existing in the cell B establishes synchronization with the user apparatus UE1 by receiving the synchronization signal from the user apparatus UE1. Then, the user apparatus UE2 detects the discovery signal transmitted from the user apparatus UE1 (step 312).

The synchronization signal may exist in a discovery subframe in the cell (intra-cell) where the synchronization signal is transmitted, or may not exist in the discovery subframe. The example shown in FIG. 18 is an example where the synchronization signal is in the discovery subframe.

[Apparatus Configuration Example]

Figure 19:
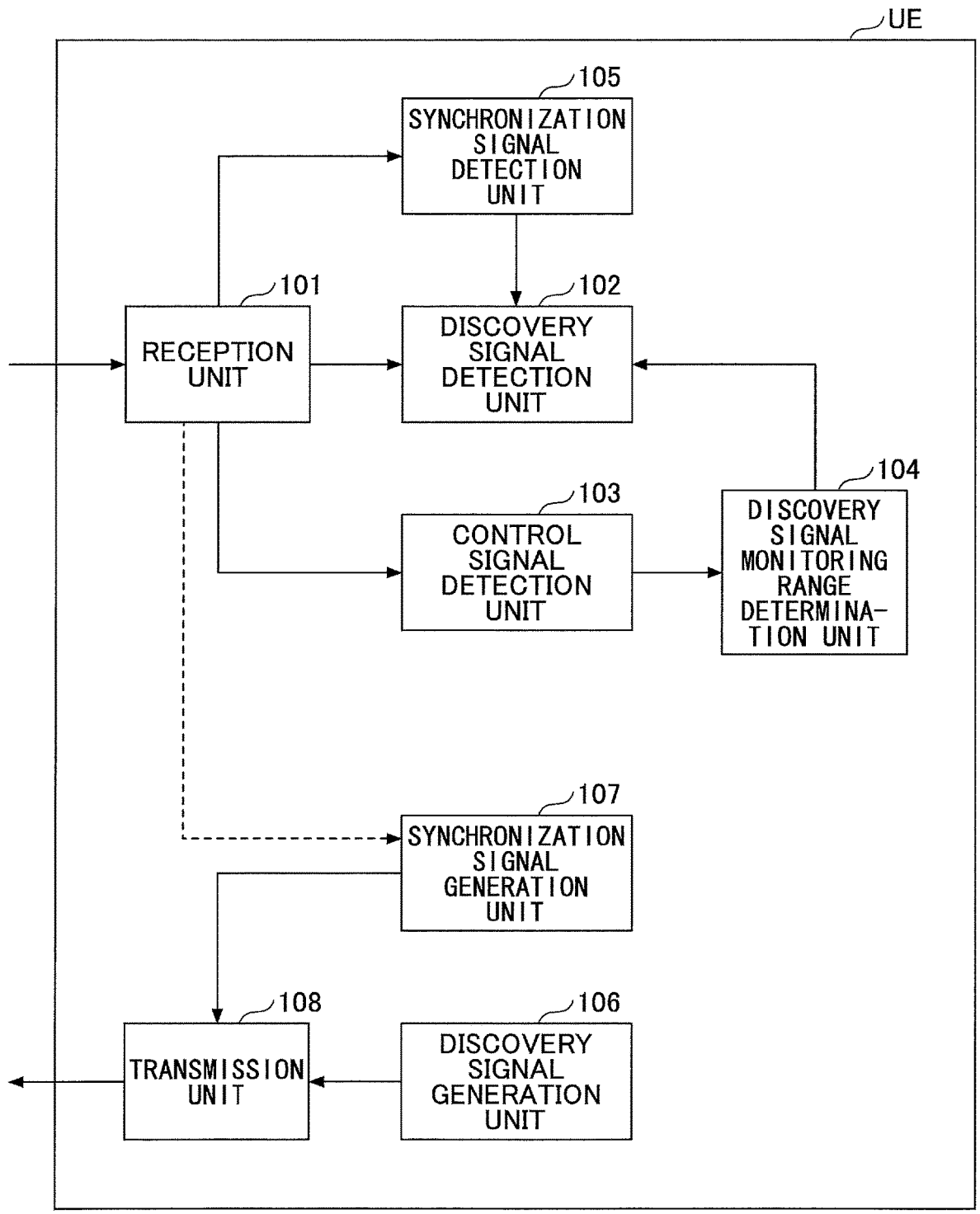
FIG. 19 is a functional block diagram of a user apparatus UE in a first embodiment.

FIG. 19 shows a functional block diagram of a user apparatus UE in the present embodiment. The example shown in FIG. 19 is an example of an apparatus that performs operation of the first method of step 101. As to step 102, the apparatus supports any method.

FIG. 19 especially shows main functions related to the present embodiment in the user apparatus UE. For example, the user apparatus UE may be further provided with necessary functions for operating as a UE complying with LTE (including LTE-Advanced).

As shown in FIG. 19, the user apparatus UE includes a reception unit 101, a discovery signal detection unit 102, a control signal detection unit 103, a discovery signal monitoring range determination unit 104, a synchronization signal detection unit 105, a discovery signal generation unit 106, a synchronization signal generation unit 107 and a transmission unit 108.

The reception unit 101 receives a discovery signal, a synchronization signal, a control signal from the base station eNB and the like. The discovery signal detection unit 102 performs monitoring (received signal demodulation and the like) in the resource range determined by the discovery signal monitoring range determination unit 104. When a synchronization signal is detected by the synchronization signal detection unit 105 within the resource range, the discovery signal detection unit 102 performs detection (decode) of a discovery signal at an accurate timing (at a time position synchronized with the neighbor cell) based on the synchronization signal.

The control signal detection unit 103 demodulates and decodes a control signal received from the base station eNB, obtains a resource range (range of a discovery subframe and the like) in the neighbor cell, passes the resource range to the discovery signal monitoring range determination unit 104. The discovery signal monitoring range determination unit 104 determines the resource range to be a discovery signal monitoring range.

The discovery signal generation unit 106 generates a discovery signal, and transmits it from the transmission unit 108. Also, when the user apparatus UE becomes an anchor UE, or when the user apparatus UE transmits a synchronization signal together with a discovery signal, or the like, the synchronization signal generation unit 107 generates a synchronization signal.

The functional sections shown in FIG. 19 are merely examples. For example, the user apparatus UE can be configured as a user apparatus, for use in a radio communication system including a base station forming a cell, configured to receive a discovery signal of device-to-device communication, including:

an information reception unit configured to receive, from a base station of a residing cell, a resource range in which a discovery signal can be transmitted in a neighbor cell; and a discovery signal reception unit configured to receive a discovery signal at a time position that is synchronized with the neighbor cell in response to receiving a synchronization signal that is synchronized with the neighbor cell within the resource range received by the information reception unit.

Figure 20:
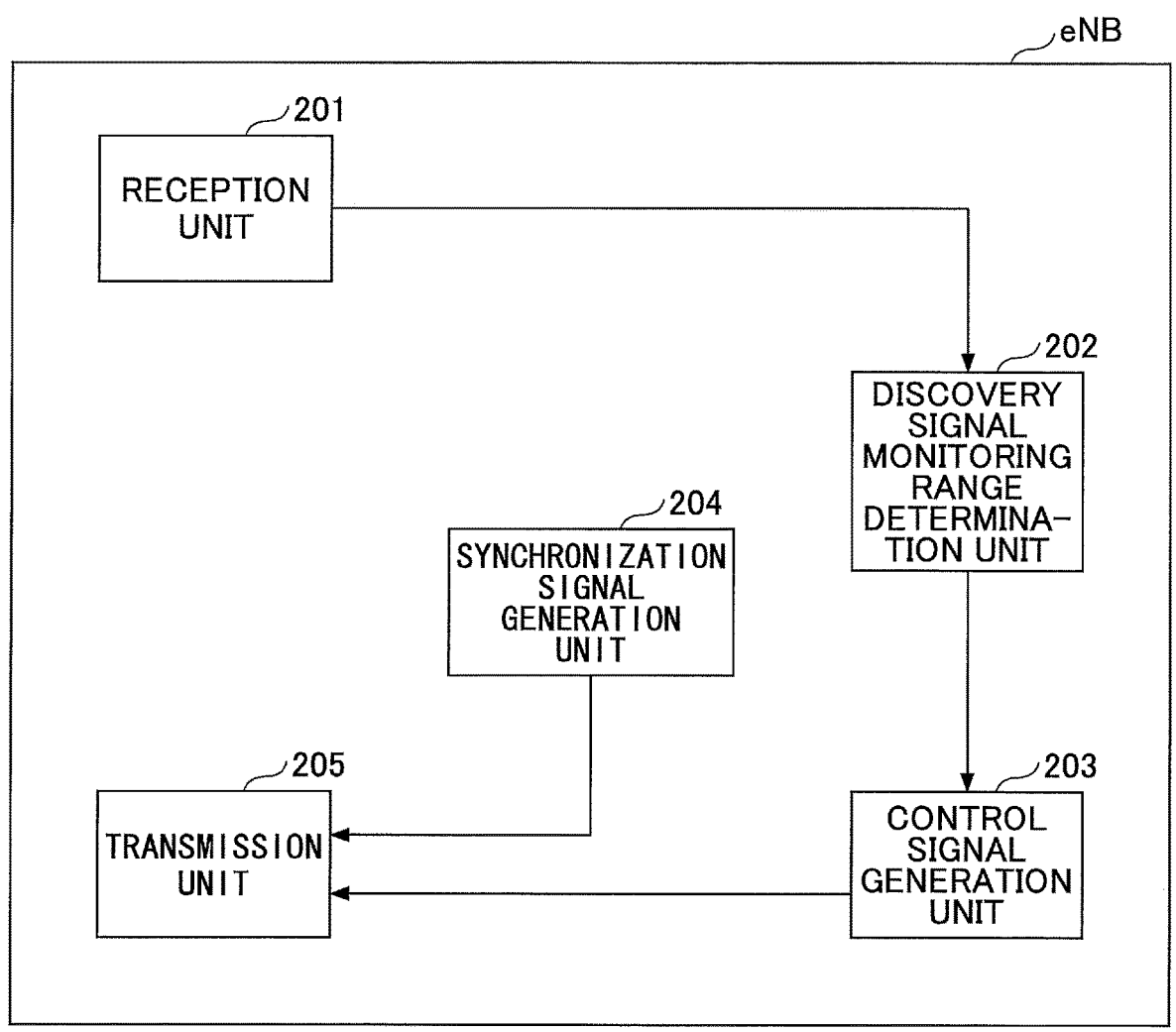
FIG. 20 is a functional block diagram of a base station eNB in the first embodiment.

FIG. 20 shows a functional block diagram of a base station eNB in the present embodiment. The example shown in FIG. 20 is an example for executing operation of the first method of step 101. As to step 102, the base station eNB supports any method.

FIG. 20 especially shows main functions related to the present embodiment in the base station eNB. For example, the base station eNB may be further provided with necessary functions for operating as an eNB complying with LTE (including LTE-Advanced).

As shown in FIG. 20, the base station eNB includes a reception unit 201, a discovery signal monitoring range determination unit 202, a control signal generation unit 203, a synchronization signal generation unit 204 and a transmission unit 205.

The reception unit 201 receives a discovery signal from a user apparatus UE of a neighbor cell, and passes resource information of the discovery signal to the discovery signal monitoring range determination unit 202. The discovery signal monitoring range determination unit 202 determines a resource range (a range of resources where a discovery signal can be transmitted and received in the neighbor cell) where the user apparatus UE of the own cell monitors a discovery signal from the neighbor cell based on the resource information, and passes the resource range to the control signal generation unit 203. The control signal generation unit 203 generates a control signal including the resource range, and transmits the control signal from the transmission unit 205 to a user apparatus UE residing in the own cell.

In the first method of step 102, the synchronization signal generation unit 204 generates a synchronization signal and transmits it from the transmission unit 205.

The functional sections shown in FIG. 20 are merely examples. For example, the base station eNB can be configured as a base station, for use in a radio communication system, configured to communicate with a user apparatus that transmits and receives a discovery signal of device-to-device communication, including:

a resource range determination unit configured to receive a discovery signal from a user apparatus that resides in a neighbor cell, and to determine a resource range in which a discovery signal can be transmitted and received in the neighbor cell based on the discovery signal; and a resource range transmission unit configured to transmit a resource range determined by the resource range determination unit to a user apparatus that resides in a cell of the base station.

Figure 21:
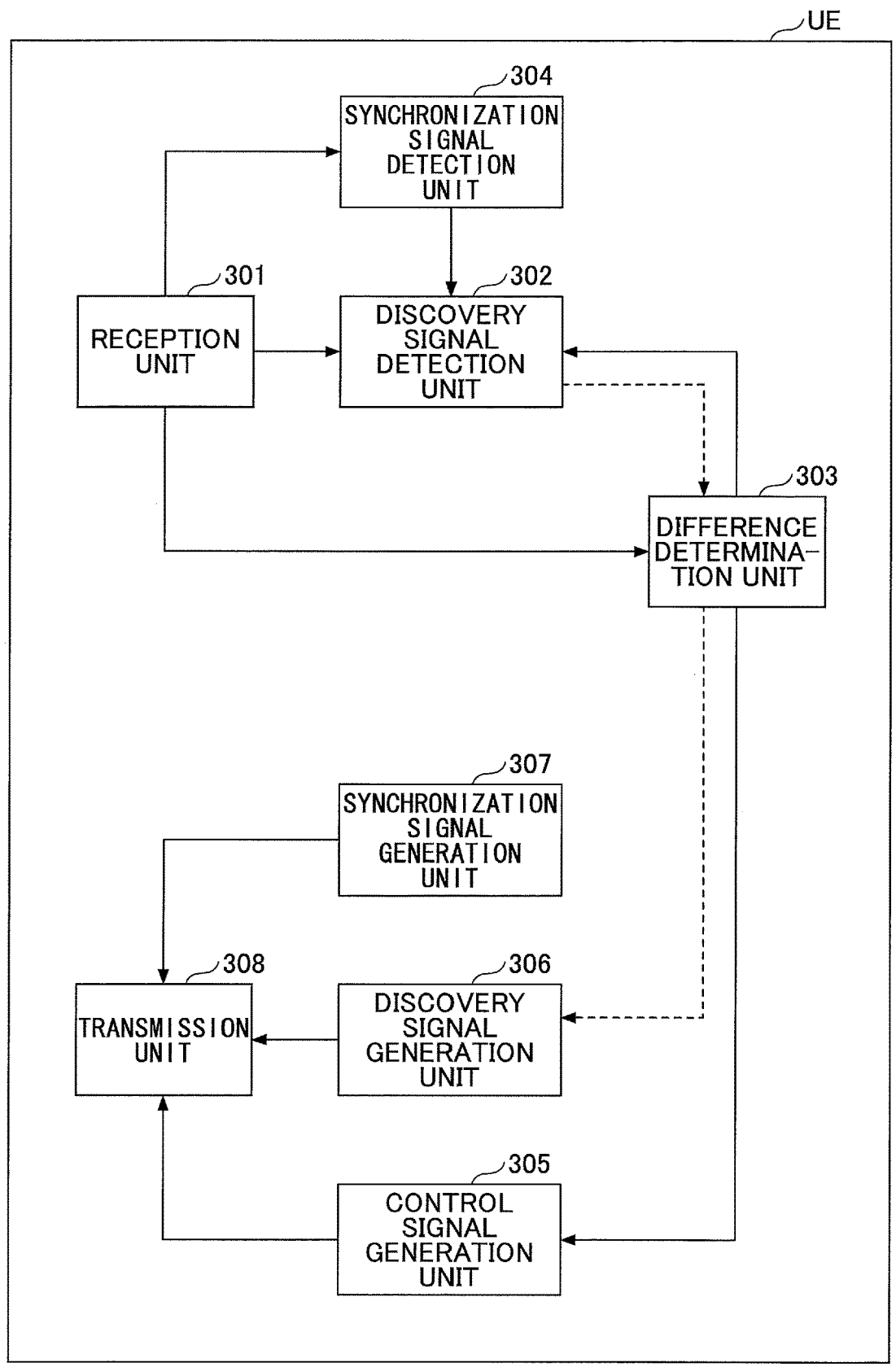
FIG. 21 is another functional block diagram of a user apparatus UE in the first embodiment.

FIG. 21 shows another functional block diagram of the user apparatus UE in the present embodiment. The example shown in FIG. 21 corresponds to the second method of step 101. As to step 102, the user apparatus UE can support any method.

FIG. 21 especially shows functions related to the present embodiment in the user apparatus UE. For example, the user apparatus UE may be further provided with necessary functions for operating as a UE complying with LTE (including LTE-Advanced).

As shown in FIG. 21, the user apparatus UE includes a reception unit 301, a discovery signal detection unit 302, a difference determination unit 303, a synchronization signal detection unit 304, a control signal generation unit 305, a discovery signal generation unit 306, a synchronization signal generation unit 307 and a transmission unit 308.

The reception unit 301 receives a discovery signal, a synchronization signal, information from the base station eNB and the like. The discovery signal detection unit 302 determines a resource range where a discovery signal can be transmitted and received in the neighbor cell based on a resource difference with respect to the neighbor cell determined by the difference determination unit 303, and performs monitoring (received signal demodulation and the like) in the resource range. When a synchronization signal is detected by the synchronization signal detection unit 304, the discovery signal detection unit 302 performs detection (decode) of a discovery signal at an accurate timing (at a time position synchronized with the neighbor cell) based on the synchronization signal.

The difference determination unit 303 determines a resource difference (example: timing difference) based on downlink signals received from the residing base station eNB and the neighbor base station eNB, and passes the information to the control signal generation unit 305. The information is also passed to the discovery signal detection unit 302. Similarly to the user apparatus UE shown in FIG. 19, the discovery signal detection unit 302 can also perform discovery signal monitoring using resource range information included in the control signal received from the base station eNB.

The control signal generation unit 305 generates a control signal including the resource difference and transmits the control signal to the base station eNB from the transmission unit 308. The discovery signal generation unit 306 generates a discovery signal, and transmits it from the transmission unit 108. In the case of the modified example, the discovery signal generation unit 306 generates a discovery signal including a resource difference, and transmits it. When the user apparatus UE becomes an anchor UE, or when the user apparatus UE transmits a synchronization signal together with a discovery signal, or the like, the synchronization signal generation unit 107 generates a synchronization signal.

The functional sections shown in FIG. 21 are merely examples. For example, the user apparatus UE may be configured as a user apparatus, for use in a radio communication system including a base station forming a cell, configured to receive a discovery signal of device-to-device communication, including:

a difference determination unit configured to determine a timing difference between a residing cell and a neighbor cell based on a downlink signal received from a base station of the residing cell and a downlink signal received from a base station of the neighbor cell;

an information transmission unit configured to transmit the timing difference determined by the difference determination unit to the base station of the residing cell; and a discovery signal reception unit configured to obtain a resource range in which a discovery signal can be transmitted in the neighbor cell based on the timing difference, and to receive a discovery signal at a time position synchronized with the neighbor cell in response to receiving a synchronization signal synchronized with the neighbor cell within the resource range.

Figure 22:
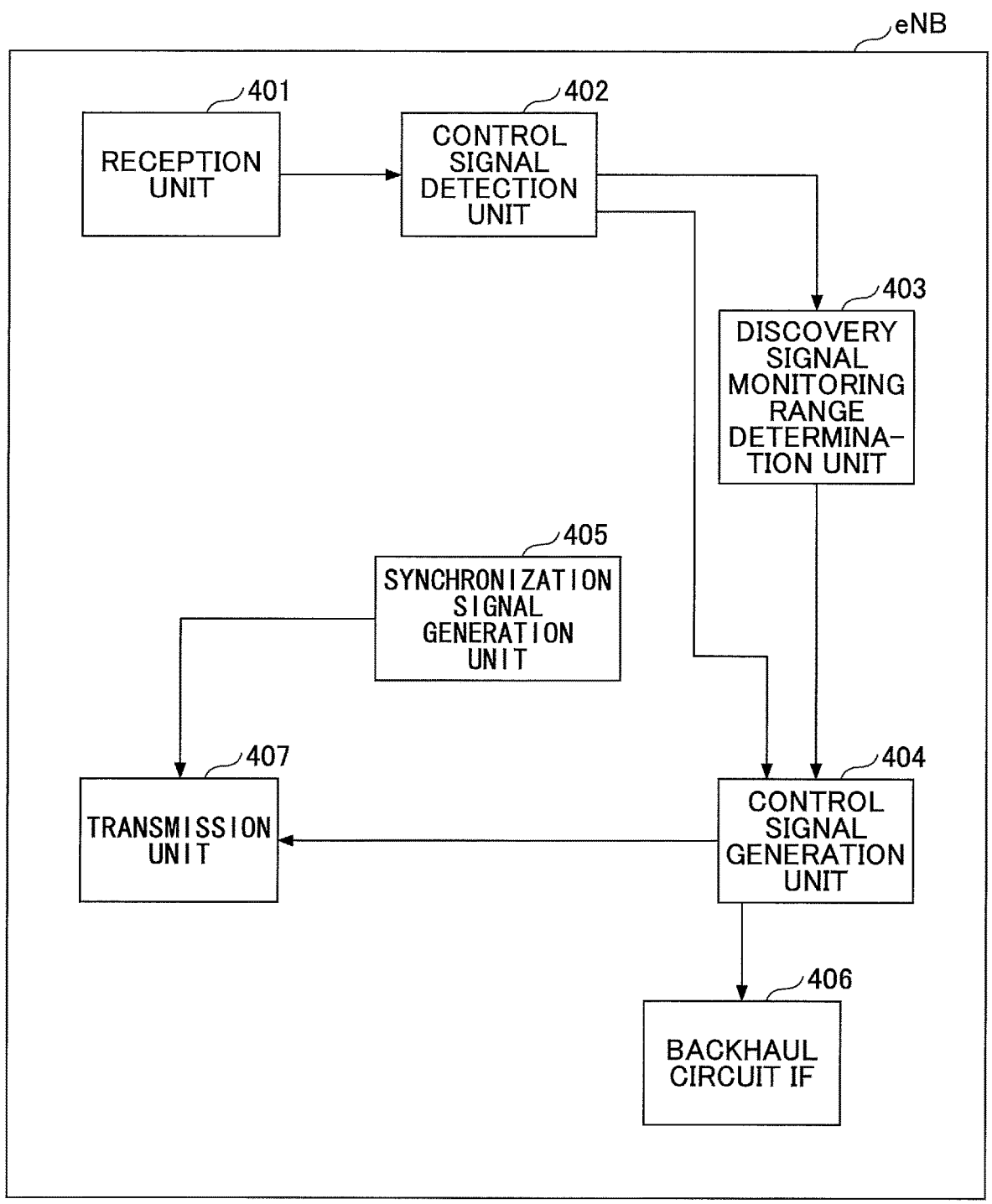
FIG. 22 is another functional block diagram of a base station eNB in the first embodiment.

FIG. 22 shows another functional block diagram of the base station eNB in the present embodiment. The example shown in FIG. 22 corresponds to the second method of step 101. As to step 102, the base station eNB can support any method.

FIG. 22 especially shows functions related to the present embodiment in the base station eNB. For example, the base station eNB may be further provided with necessary functions for operating as an eNB complying with LTE (including LTE-Advanced).

As shown in FIG. 22, the base station eNB includes a reception unit 401, a control signal detection unit 402, a discovery signal monitoring range determination unit 403, a control signal generation unit 404, a synchronization signal generation unit 405, a backhaul circuit IF 406 and a transmission unit 407.

The reception unit 401 receives a control signal including a resource difference from a user apparatus UE of the own cell. The control signal detection unit 402 obtains the resource difference from the control signal, and passes the resource difference to the discovery signal monitoring range determination unit 403. The discovery signal monitoring range determination unit 403 determines a resource range (a range of resources where a discovery signal can be transmitted and received in a neighbor cell) where the user apparatus UE of the own cell monitors a discovery signal from the neighbor cell based on the resource difference information, and passes the resource range to the control signal generation unit 404. The control signal generation unit 404 generates a control signal including the resource range, and transmits the control signal from the transmission unit 407 to a user apparatus UE residing in the own cell.

Also, the control signal generation unit 404 receives information of the resource difference from the control signal detection unit 402, and transmits the information to the neighbor base station eNB by the backhaul circuit IF 406. Also, the backhaul circuit IF 406 has a function for receiving a resource difference from the neighbor base station eNB, and passing the resource difference to the discovery signal monitoring range determination unit 403. The discovery signal monitoring range determination unit 403 can also determine a resource range for monitoring a discovery signal from the neighbor cell based on the resource difference.

In the first method of step 102, the synchronization signal generation unit 405 generates a synchronization signal and transmits it from the transmission unit 407.

The functional sections shown in FIG. 22 are merely examples. For example, the base station eNB may be configured as a base station, for use in a radio communication system, configured to communicate with a user apparatus that transmits and receives a discovery signal of device-to-device communication, including:

a resource range determination unit configured to receive, from a user apparatus that resides in a cell of the base station, a timing difference between the cell and a neighbor cell, and to determine a resource range in which a discovery signal can be transmitted and received in the neighbor cell based on the timing difference; and a resource range transmission unit configured to transmit a resource range determined by the resource range determination unit to a user apparatus that resides in the cell of the base station.

Summary of the Second Embodiment

Next, the second embodiment of the present invention is described.

Figure 23:
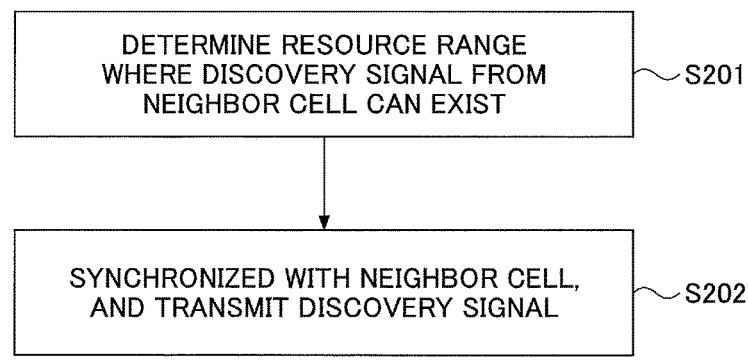
FIG. 23 is a flowchart showing an outline of a procedure of processing executed by a user apparatus UE in the side of transmitting a discovery signal.

FIG. 23 is a flowchart showing a summary of a procedure of processes executed by a user apparatus UE in the discovery signal transmitting side in the present embodiment.

Step 201) The user apparatus UE determines a (rough) resource range (example: time-frequency range, time range) where a discovery signal from a neighbor cell can exist. That is, the user apparatus UE determines a resource range where a discovery signal can be detected in the neighbor cell. The "resource range" in step 201 is mainly a time range in the concrete example, but, the resource range may be a time-frequency range.

Similarly to the first embodiment, there are a first method and a second method as determination methods. In the first method, the base station eNB observes a discovery signal transmitted from a neighbor cell, detects a resource range of the discovery signal reception in the neighbor cell based on the observation, and reports the information to user apparatuses UE under the base station eNB.

In the second method, a user apparatus UE at a cell edge receives a downlink signal from a base station eNB of a neighbor cell, detects a difference of subframe timing between the own cell and the neighbor cell, and reports the difference information to the base station eNB of the own cell. Then, the base station eNB reports the information of the difference to user apparatuses UE under the base station eNB. Accordingly, the user apparatus UE can ascertain the range (resource range) of the discovery period in the neighbor cell.

Step 202) The user apparatus UE that receives the resource range where a discovery signal from the neighbor cell can be detected in step 201 establishes synchronization with the timing of the neighbor cell in the period of the range, so as to transmit a discovery signal at a discovery subframe of the neighbor cell.

In order to establish synchronization with the neighbor cell, the user apparatus UE receives a synchronization signal from the neighbor cell. As concrete methods for it, there are two types. In a first method, the user apparatus UE receives a synchronization signal transmitted from a base station eNB of the neighbor cell. In a second method, the user apparatus UE receives a synchronization signal from a selected user apparatus UE (anchor UE) in the neighbor cell.

In the following, the second embodiment is described in more detail.

[Step 201: The User Apparatus UE Ascertains a Resource Range where a Discovery Signal can be Detected in the Neighbor Cell]

<First Method in Step 201>

First, details of the first method in step 201 are described in detail. As described before, in the first method, the base station eNB observes a discovery signal transmitted from a neighbor cell, detects a rough resource range (example: time-frequency range, time range) of discovery signal transmission and reception in the neighbor cell based on the observation, and reports a signal including the information to user apparatuses UE under the base station eNB.

The signal that the base station eNB reports to the user apparatus UE under the base station eNB includes, for example, an absolute time-frequency range, an absolute time range, or information of difference with respect to a discovery resource position in the own cell, or the like. Although there is no limitation for the method of reporting the signal, the signal can be reported by, for example, broadcast signaling such as notification information, RRC signaling, (E)PDCCH signaling and the like. Also, combinations of these may be used.

A concrete example in the first method is described with reference to FIGS. 24(a) and (b). As shown in FIG. 24(a), the user apparatus UE1 and the user apparatus UE3 reside in a cell A, and the user apparatus UE2 resides in a cell B. In this system, in each cell, a subframe 3 is assigned as a subframe for discovery signal transmission and reception. Also, in the following example, although a time range is especially focused on as a resource range, the base station eNB may also ascertain a frequency range (band range) of a discovery resource in the neighbor cell based on a received discovery signal so as to report frequency difference (or neighbor cell use frequency) together with the time difference.

As shown in FIG. 24(a), the position of the user apparatus UE1 is a cell edge of the cell A, and also is a cell edge of the cell B. The user apparatus UE1 transmits a discovery signal in the subframe 3, so that the discovery signal is received by the user apparatus UE3, and is received by the base station eNB-B of the cell B (step 211).

The base station eNB-B that receives the discovery signal determines that a discovery period in the neighbor cell A corresponds to subframes 0 and 1 in the timing of the base station eNB-B, and the base station eNB-B reports, to the user apparatus UE2 under the own base station, that a discovery subframe in the neighbor cell is within a range of the subframes 0 and 1 in the own base station (step 212).

As shown in FIG. 24(b), the user apparatus UE2 that receives the report determines to transmit a discovery signal to the user apparatus UE1 of the neighbor cell A in the subframes 0 and 1. After that, as described later, the user apparatus UE2 transmits a discovery signal in accordance with a detection timing in the neighbor cell based on a synchronization signal.

The user apparatus UE (example: the above-mentioned user apparatus UE2) that receives the report from the own base station eNB may always transmit a discovery signal at a timing of the neighbor cell, or may transmit it only when a predetermined condition is satisfied.

In the latter case, for example, the user apparatus UE determines to transmit a discovery signal at a timing of the neighbor cell based on reference signals from the residing base station eNB and the neighbor base station eNB. For example, the user apparatus UE determines to transmit a discovery signal at a timing of the neighbor cell when a power of the reference signal from the neighbor base station eNB is larger than a predetermined threshold, and a power of the reference signal from the residing base station eNB is smaller than a predetermined threshold. The thresholds can be properly updated by a downlink signal from the residing base station eNB, for example. The downlink signal is reported by broadcast signaling, (e)PDCCH, RRC signaling and the like. Also, the residing base station eNB or the neighbor base station eNB may directly instruct the user apparatus UE to transmit a discover signal at a timing of the neighbor cell.

The above-mentioned method in which the user apparatus UE determines whether to transmit a discover signal at a timing of the neighbor cell is also applied to examples of other methods.

<Second Method in Step 201>

Next, a second method in step 201 is described in detail. As described before, in the second method, a user apparatus UE at a cell edge receives a downlink signal from a base station eNB of a neighbor cell, so that the user apparatus UE detects timing difference of subframe between the own cell and the neighbor cell, and reports the information of the difference to a base station eNB of the own cell. Then, the base station eNB reports the information of the difference to user apparatuses UE under the base station eNB.

Also, the base station eNB may report the timing difference to a neighbor base station eNB using a backhaul circuit (example: X2 interface). Then, the neighbor base station eNB that receives the information reports, to user apparatuses US under the neighbor base station eNB, a resource range where a discovery signal should be transmitted to the neighbor cell. The report information may be absolute information or may a difference of a discovery resource position with respect to the own base station. Also, the information is transmitted by, for example, broadcast signaling, RRC signaling, (e)PDCCH signaling, or a combination of these.

For example, a signaling from the base station eNB of the neighbor cell may be used as a trigger for the user apparatus UE at the cell edge to measure a downlink signal from the base station eNB of the neighbor cell and to report the difference.

Also, the measurement and the report may be triggered by an event such as satisfaction of a condition, and the like. The event may be, for example, that a power of a discovery signal from a neighbor cell becomes greater than a predetermined threshold, and the like.

Figure 25:
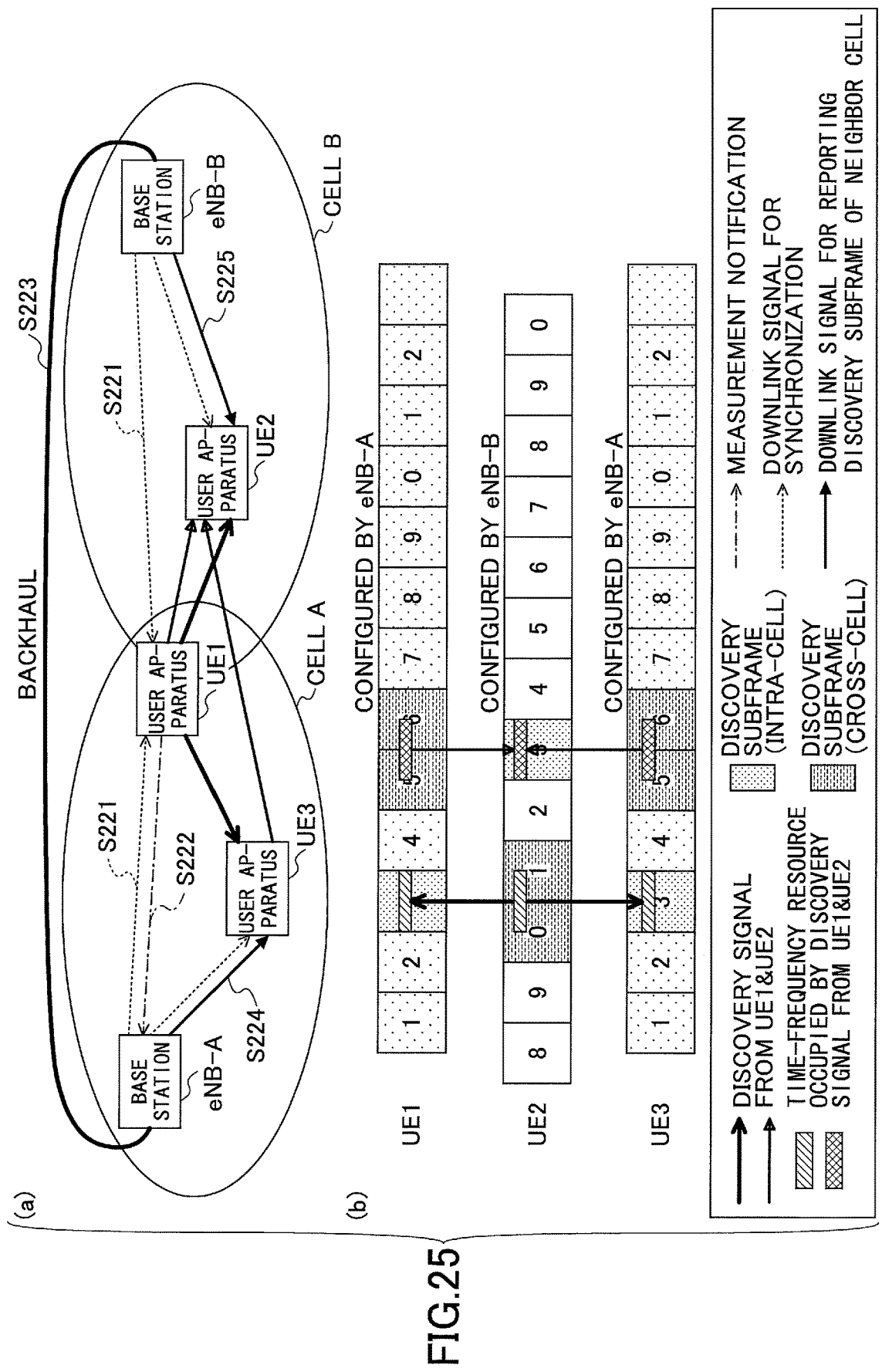
FIG. 25 is a diagram showing a concrete example of a second method in step 201.

Next, concrete examples of the second method are described with reference to FIGS. 25(a) and (b). As shown in FIG. 25(a), in this example, a user apparatus UE1 and a user apparatus UE3 reside in a cell A, and a user apparatus UE2 resides in a cell B. Also, in this system, a subframe 3 is assigned in each cell as a subframe for transmitting and receiving a discovery signal. Also in the following example, although explanation is given by especially focusing on a time range as a resource range of a discovery signal in the neighbor cell, the user apparatus UE may ascertain a frequency range (band range) of a discovery resource of a neighbor cell based on downlink signals from the residing base station eNB and the neighbor base station eNB, so as to report, to the residing base station eNB, a neighbor cell use frequency or a frequency difference together with the time difference.

As shown in FIG. 25(a), the position of the user apparatus UE1 is a cell edge of the cell A and also is a cell edge of the cell B. The user apparatus UE1 receives a downlink signal from the base station eNB-A, and also receives a downlink signal from the base station eNB-B (step 221).

The user apparatus UE1 estimates a timing difference (about 2.5 subframes in this example) between the base station eNB-A and the base station eNB-B based on a downlink signal from the base station eNB-A and a downlink signal from the base station eNB-B. The user apparatus UE1 transmits, to the base station eNB-A, information indicating that the cell A is faster than the cell B by about 2.5 subframes (step 222).

The base station eNB-A that receives the information reports, to the base station eNB-B, difference information of the timing by using a backhaul circuit (step 223). Also, the base station eNB-A reports, to the user apparatus UE3 under the base station eNB-A, subframes 5 and 6 corresponding to a time position that is delayed by 2.5 subframes with respect to the subframe 3 as a resource range of discovery subframes in the neighbor cell B (step 224).

Also, the base station eNB-B reports, to the user apparatus UE2 under the base station eNB-B, subframes 0 and 1 corresponding to a time position that is advanced by 2.5 subframes with respect to the subframe 3 as a resource range of discovery subframes in the neighbor cell A (step 225).

Then, as shown in FIG. 25(b), the user apparatuses UE1 and UE3 of the cell A determines to transmit a discovery signal to the neighbor cell B (user apparatus UE2) in a range of subframes 5 and 6 including the time position of the discovery subframe of the neighbor cell B. Also, the user apparatus UE2 of the cell B determines to transmit a discovery signal to the neighbor cell A (user apparatuses UE1 and UE3) at subframes 0 and 1 including the time position of the discovery subframe of the neighbor cell A.

Figure 12:
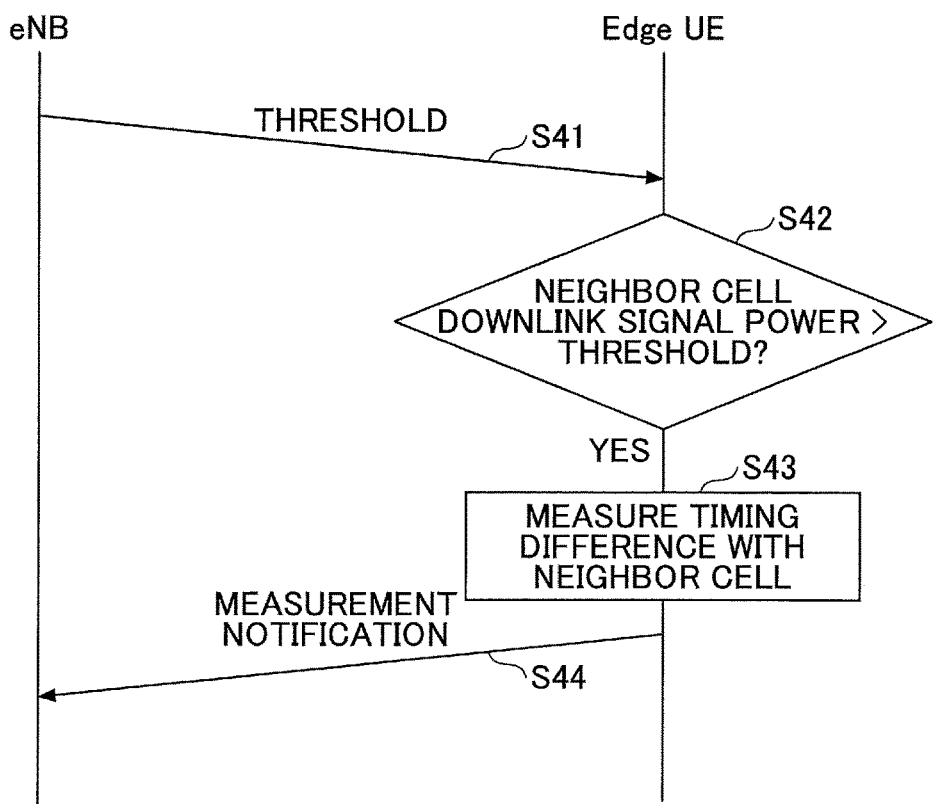
FIG. 12 is a procedure example 2 of measurement and reporting executed by a user apparatus UE at a cell edge in the second method.
Figure 13:
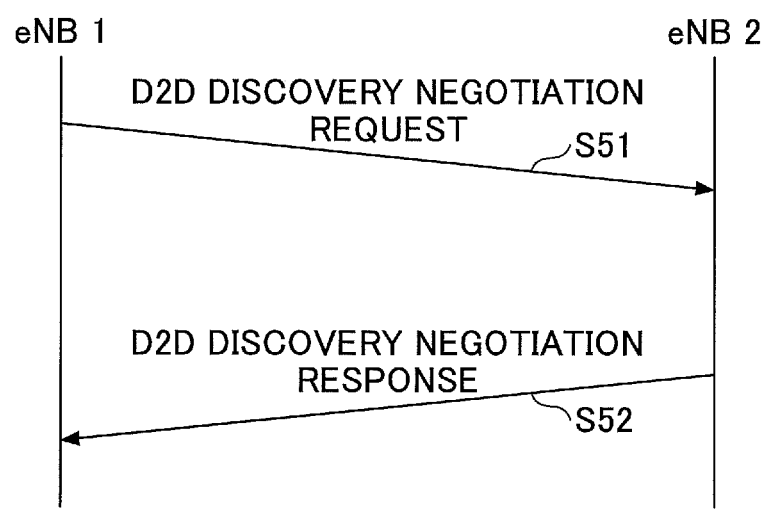
FIG. 13 is a procedure example of communication between base stations.

Procedure examples of measurement and reporting executed by a user apparatus UE at a cell edge in the second method are the same as those in the first embodiment, and are as described using FIGS. 11-13.

<Modified Example of Second Method>

The user apparatus UE at the cell edge may transmit (broadcast) a timing difference estimation result to surrounding user apparatuses UE by a discovery signal. This process can be performed, for example, in a case where the user apparatus UE cannot communicate with the base station eNB or process amount for communication is required since the user apparatus UE is in an RRC idle state.

The discovery signal transmitted by the user apparatus UE at the cell edge in this case includes information of the timing difference. For example, the information is configured such that a message segment of 4 bits indicates the number of subframes of the timing difference (offset). As an example, 0011 indicates a timing difference of 3 subframes.

Also, for example, a message segment of 2 bits indicates the number of subframes (length of a period) during which a discovery signal should be transmitted to a neighbor cell. As an example, 10 indicates that a discovery signal can be transmitted to a neighbor cell during a period of 2 subframes.

In this example, when a surrounding user apparatus UE receives a discovery signal including timing difference information, the user apparatus UE includes the timing difference information into a discovery signal of itself, and transmits the discovery signal.

Also, the base station eNB may transmit a threshold for the user apparatus UE to determine whether to transmit timing difference information by a discovery signal to surrounding user apparatuses UE. In this case, for example, only when a power of a downlink signal from the base station eNB is smaller than the threshold (when the user apparatus UE is in a cell edge), the user apparatus UE transmits a discovery signal including timing difference information to surrounding user apparatuses UE.

Figure 26:
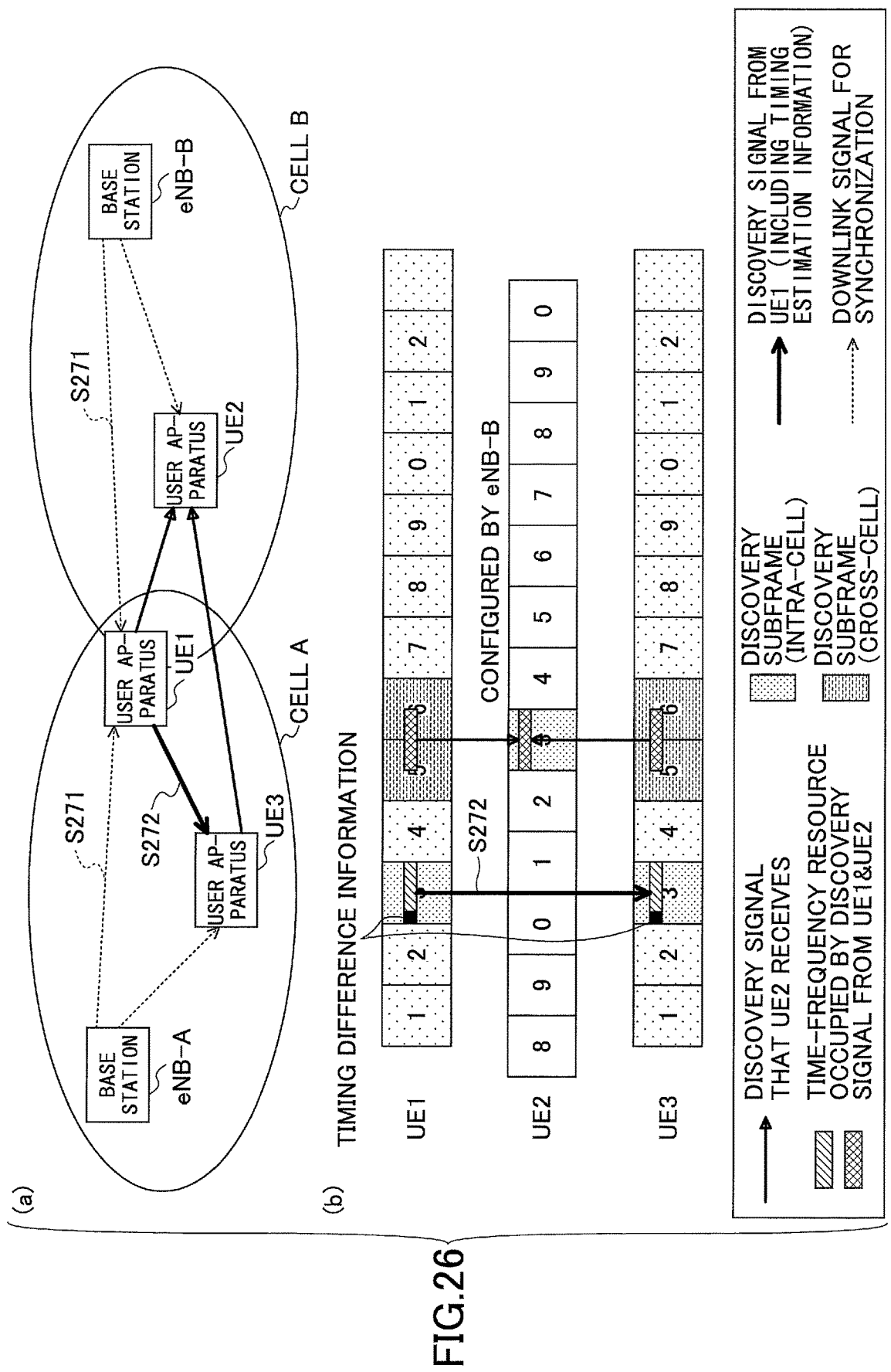
FIG. 26 is a diagram showing a concrete example of a modified example of the second method.

Next, a concrete example in a modified example is described with reference to FIGS. 26(a) and (b). As shown in FIG. 26(a), in this example, the user apparatus UE1 and the user apparatus UE3 reside in the cell A, and the user apparatus UE2 resides in the cell B. Also, in this system, a subframe 3 is assigned in each cell as a subframe for transmitting and receiving a discovery signal.

The position of the user apparatus UE1 is a cell edge of the cell A and also is a cell edge of the cell B. The user apparatus UE1 receives a downlink signal from the base station eNB-A, and also receives a downlink signal from the base station eNB-B (step 271).

The user apparatus UE1 estimates a timing difference (about 2.5 subframes in this example) between the base station eNB-A and the base station eNB-B based on a downlink signal from the base station eNB-A and a downlink signal from the base station eNB-B. The user apparatus UE1 transmits a discovery signal including information indicating that the cell A is faster than the cell B by about 2.5 subframes (step 272).

The discovery signal including the timing difference information transmitted from the user apparatus UE1 is received by the user apparatus UE3 in the same cell. Then, the user apparatus UE3 learns that a discovery subframe in the neighbor cell B is within a range of subframes 5 and 6. Accordingly, the user apparatuses UE1 and UE3 can transmit a discovery signal to the neighbor cell B at the subframes 5 and 6.

As mentioned above, since the range for monitoring a synchronization signal (range for transmitting a discovery signal) is restricted in step 201, the user apparatus UE can transmit a discovery signal such that the discovery signal can be detected efficiently in the neighbor cell even in an asynchronous environment.

[Step 202: The User Apparatus UE Establishes Synchronization with a Neighbor Cell]

In step 202, the user apparatus UE receives a synchronization signal within a resource range, of a neighbor cell discovery signal, reported in step 201, establishes synchronization with the neighbor cell, and transmits a discovery signal to a user apparatus UE of the neighbor cell. As described before, there are two types of methods for transmitting and receiving a synchronization signal. In the following, first to second methods in step 202 are described in detail.

The synchronization signal in this example is, for example, a signal having a predetermined pattern. When a user apparatus UE detects reception of a synchronization signal (predetermined pattern), the user apparatus UE determines that a discovery subframe comes after a predetermined time (after-mentioned T), so that the user apparatus UE transmits a discovery signal after the predetermined time. Also, the synchronization signal may include the time T or information of a discovery resource (time-frequency resource).

<First Method in Step 202>

In the first method, the user apparatus UE establishes synchronization with a neighbor cell by receiving a downlink signal (synchronization signal) of a base station eNB of the neighbor cell, and transmits a discovery signal to the neighbor cell.

That is, in the first method, a synchronization signal for synchronization in the user apparatus UE is transmitted from the neighbor base station eNB.

A predetermined time T is defined as a time between a discovery subframe and the synchronization signal. Thus, the user apparatus UE that receives the synchronization signal from the neighbor base station eNB can ascertain that a discovery subframe of the neighbor cell starts after the time T, and can transmit a discovery signal at an accurate timing.

The synchronization signal transmitted from the neighbor base station eNB may be an existing downlink signal such as PSS/SSS and the like, or may be a signal newly defined for D2D synchronization of the neighbor cell.

A concrete example is described with reference to FIGS. 27(a) and (b). As shown in FIGS. 27(a) and (b), in this example, the base station eNB-A transmits a synchronization signal by a downlink band (DL spectrum) (step 281). The user apparatus UE2 that exists in the cell B establishes synchronization with the neighbor cell A by receiving the synchronization signal from the base station eNB-A. That is, the user apparatus UE2 establishes synchronization with the base station eNB-A and the user apparatus UE1. Reception of the synchronization signal is performed by non-coherent detection, for example.

By receiving the synchronization signal, the user apparatus UE2 can determine a resource position (although this is a time-frequency position, the present example especially focuses on a time position) of a discovery signal that the user apparatus UE1 of the neighbor cell receives, and can transmit a discovery signal to the user apparatus UE1 at an accurate timing (step 282).

Figure 27:
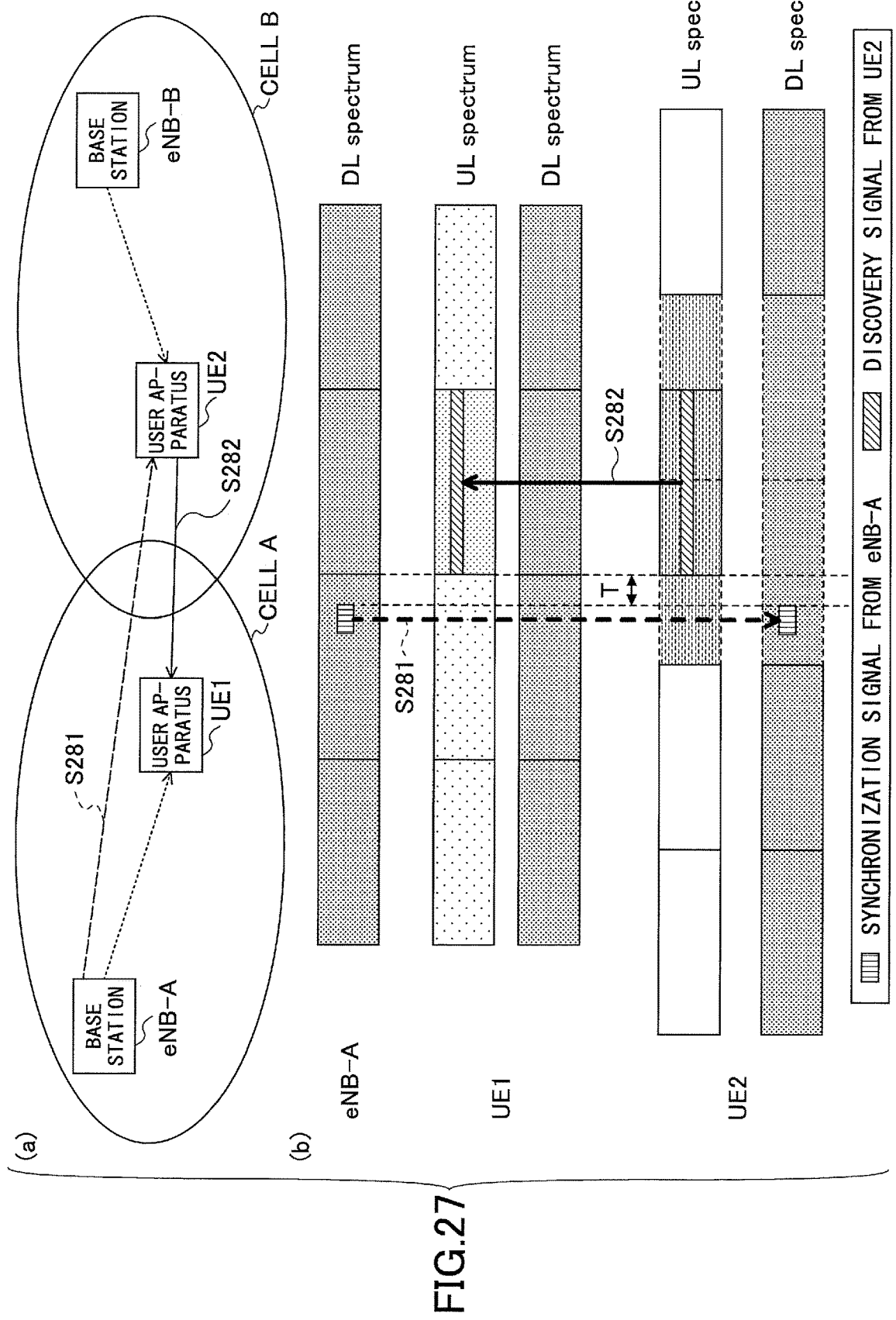
FIG. 27 is a diagram showing a concrete example of a first method in step 202.

The synchronization signal may exist in a discovery subframe in the cell (intra-cell) where the synchronization signal is transmitted, or may not exist in the discovery subframe. The example shown in FIG. 27 is an example where the synchronization signal is not in the discovery subframe.

<Second Method of Step 202>

In the second method, a synchronization signal is transmitted from a particular user apparatus UE (to be referred to as anchor UE) of the neighbor cell to a user apparatus, and the user apparatus UE establishes synchronization with the neighbor cell and transmits a discovery signal to the neighbor cell. The anchor UE of the neighbor cell is synchronized with the base station eNB of the neighbor cell. Also, the anchor UE may be a user apparatus UE selected by the base station eNB, or may be a predetermined user apparatus placed in a distributed manner.

Similarly to the first method, a predetermined time T is defined as a time between a discovery subframe and the synchronization signal. Thus, the user apparatus UE that receives the synchronization signal from the anchor UE can ascertain that a discovery subframe of the neighbor cell starts after the time T, and can transmit a discovery signal accurately.

The synchronization signal transmitted from the anchor UE may be an existing signal such as PSS/SSS and the like, or may be a signal newly defined for D2D synchronization of the neighbor cell. Also, for the synchronization signal, scheduling is performed such that the synchronization signal does not interfere with normal cellular communication.

A concrete example is described with reference to FIGS. 28(a) and (b). As shown in FIGS. 28(a) and (b), in this example, the anchor UE residing in the cell A transmits a synchronization signal using an uplink band (UL spectrum) (step 291). The user apparatus UE2 existing in the neighbor cell establishes synchronization with the neighbor cell A by receiving the synchronization signal from the anchor UE.

That is, the user apparatus UE2 establishes synchronization with the anchor UE and the user apparatus UE1.

In the first and the second embodiments, it is merely an example to use an uplink band (UL spectrum) for transmitting and receiving a discovery signal and a synchronization signal.

By receiving the synchronization signal, the user apparatus UE2 can ascertain a resource (time position in this example) of a discovery signal received by the user apparatus UE1 of the neighbor cell, so that the user apparatus UE2 can transmit a discovery signal to the user apparatus UE1 at an accurate timing (step 292).

Figure 28:
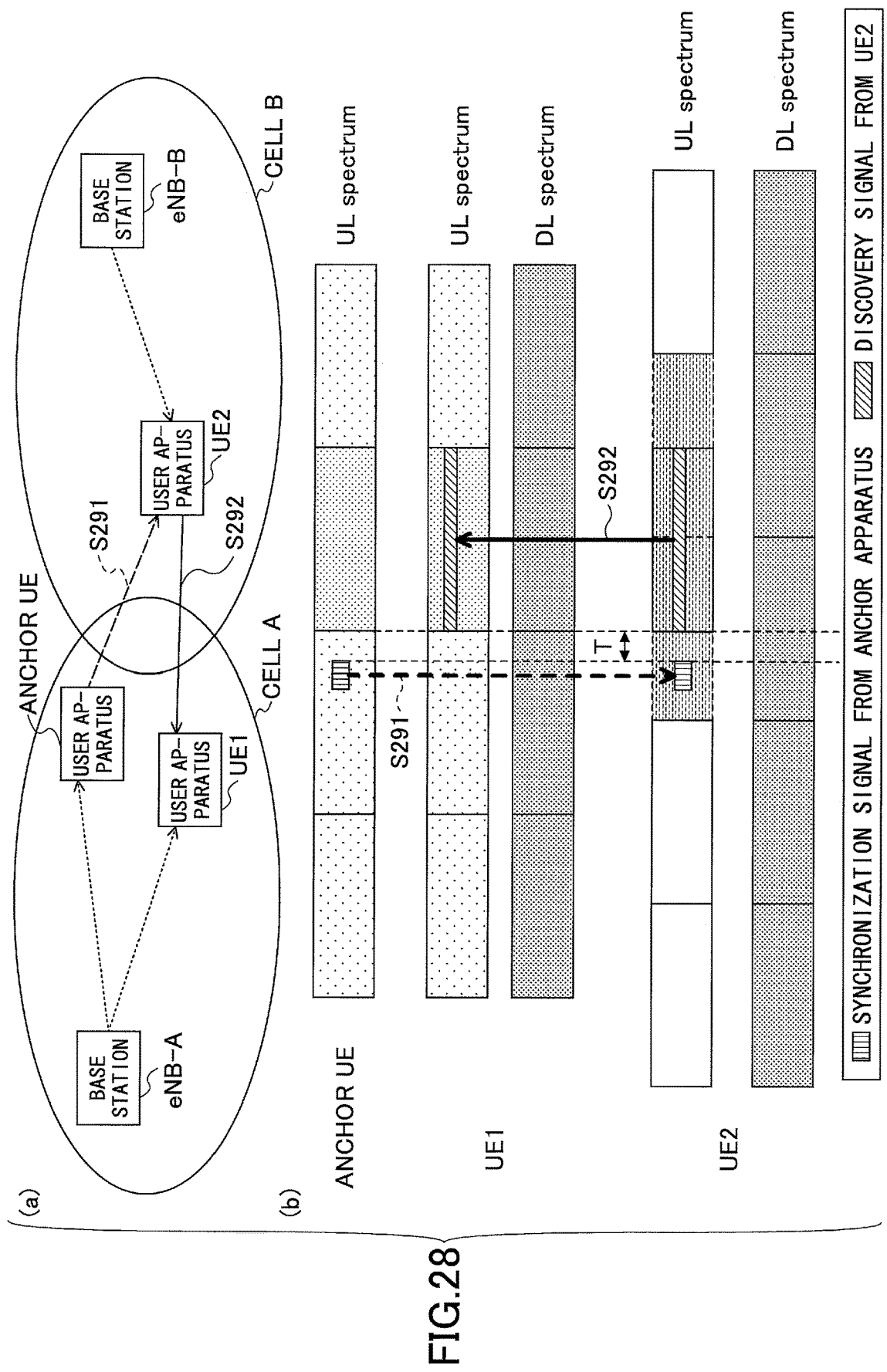
FIG. 28 is a diagram showing a concrete example of a second method in step 202.

The synchronization signal may exist in a discovery subframe in the cell (intra-cell) where the synchronization signal is transmitted, or may not exist in the discovery subframe. The example shown in FIG. 28 is an example where the synchronization signal is not in the discovery subframe.

[Apparatus Configuration Example]

Figure 29:
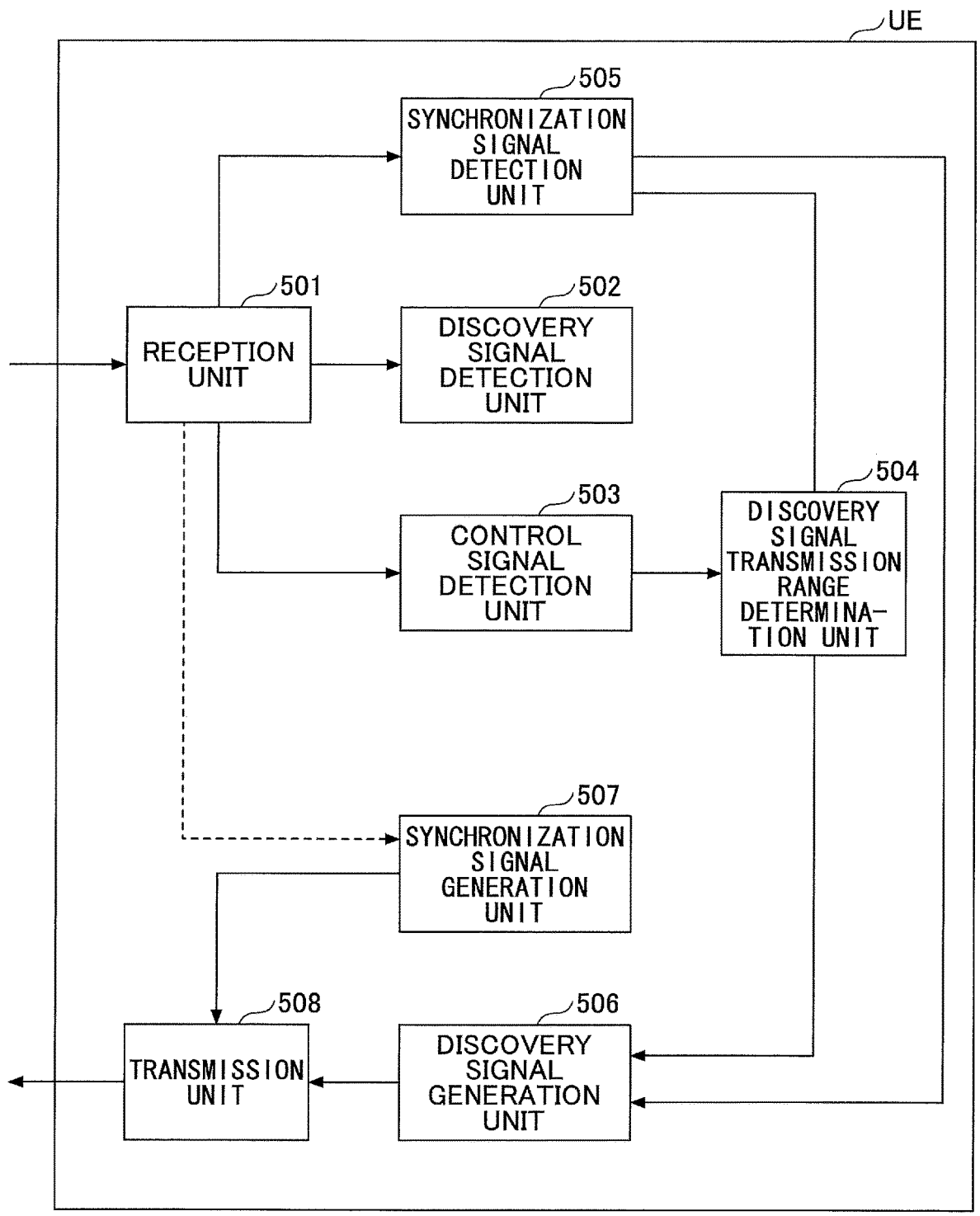
FIG. 29 is a functional block diagram of a user apparatus UE in a second embodiment.

FIG. 29 shows a functional block diagram of a user apparatus UE in the present embodiment. The example shown in FIG. 29 corresponds to the first method of step 201. As to step 202, the apparatus supports any method.

FIG. 29 especially shows main functions related to the present embodiment in the user apparatus UE. For example, the user apparatus UE may be further provided with necessary functions for operating as a UE complying with LTE (including LTE-Advanced).

As shown in FIG. 29, the user apparatus UE includes a reception unit 501, a discovery signal detection unit 502, a control signal detection unit 503, a discovery signal transmission range determination unit 504, a synchronization signal detection unit 505, a discovery signal generation unit 506, a synchronization signal generation unit 507 and a transmission unit 508.

The reception unit 501 receives a discovery signal, a synchronization signal, a control signal from the base station eNB and the like. The discovery signal detection unit 502 detects (decodes) a discovery signal.

The control signal detection unit 503 demodulates and decodes a control signal received from the base station eNB, obtains a resource range (such as a range of a discovery subframe, a range of a resource where a discovery signal can be received in the neighbor cell) in the neighbor cell, passes the resource range to the discovery signal transmission range determination unit 504. The discovery signal transmission range determination unit 504 determines the resource range to be a discovery signal transmission range.

The resource range is passed to the discovery signal generation unit 506 and the like. When a synchronization signal is detected by the synchronization signal detection unit 505 in the resource range, the discovery signal generation unit 506 generates a discovery signal at an accurate timing (time position synchronized with the neighbor cell) obtained from the synchronization signal, and transmits it from the transmission unit 508. Also, when the user apparatus UE becomes an anchor UE, and the like, the synchronization signal generation unit 507 generates a synchronization signal.

The functional sections shown in FIG. 29 are merely examples. For example, the user apparatus UE may be configured as a user apparatus, for use in a radio communication system including a base station forming a cell, configured to transmit a discovery signal of device-to-device communication, including:

an information reception unit configured to receive, from a base station of a residing cell, a resource range in which a discovery signal can be received in a neighbor cell; and a discovery signal transmission unit configured to transmit a discovery signal at a time position that is synchronized with the neighbor cell in response to receiving a synchronization signal that is synchronized with the neighbor cell within the resource range received by the information reception unit.

Figure 30:
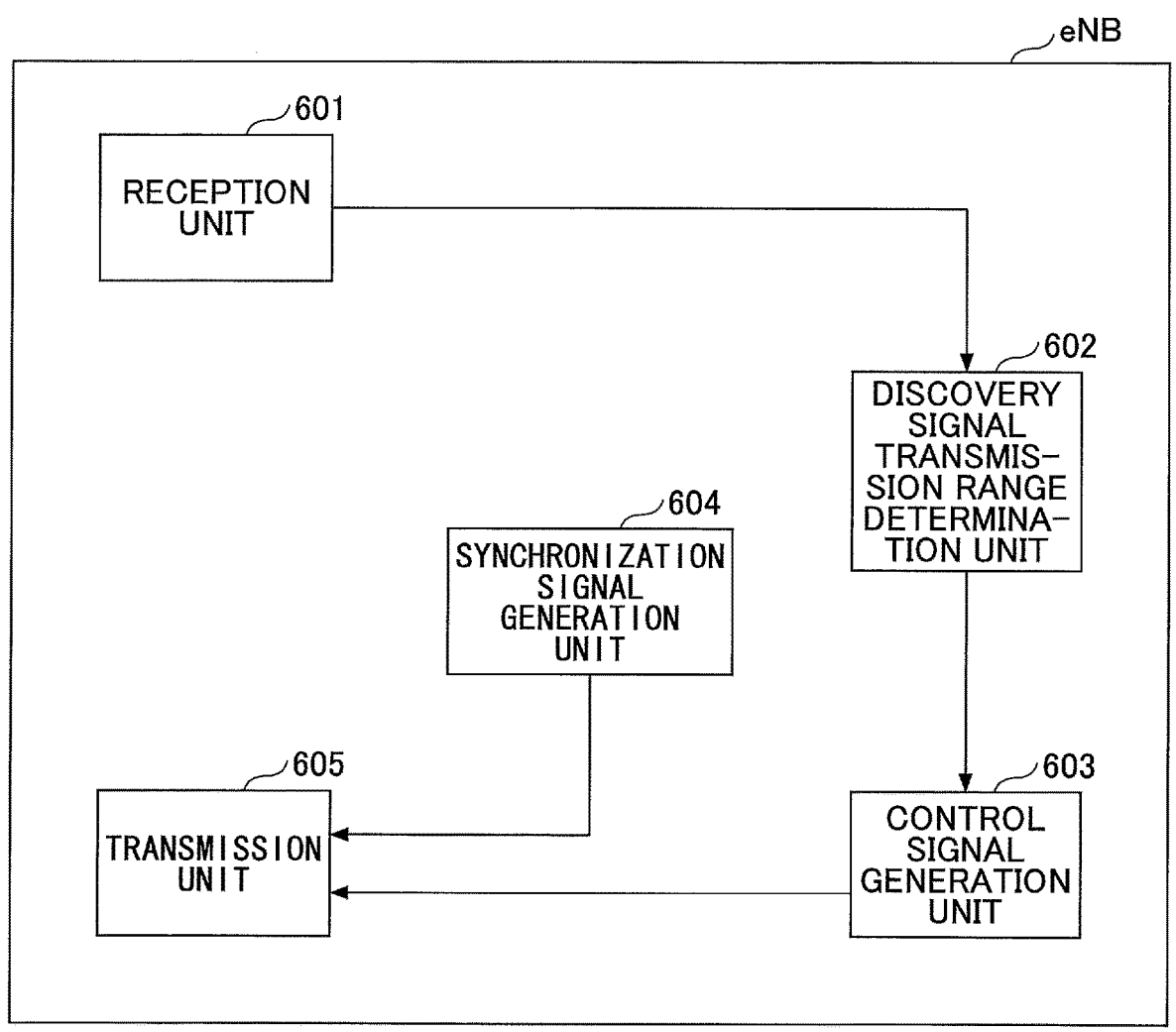
FIG. 30 is a functional block diagram of a base station eNB in the second embodiment.

FIG. 30 shows a functional block diagram of a base station eNB in the present embodiment. The example shown in FIG. 30 corresponds to the first method of step 201. As to step 202, the base station eNB supports any method.

FIG. 30 especially shows main functions related to the present embodiment in the base station eNB. For example, the base station eNB may be further provided with necessary functions for operating as an eNB complying with LTE (including LTE-Advanced).

As shown in FIG. 30, the base station eNB includes a reception unit 601, a discovery signal transmission range determination unit 602, a control signal generation unit 603, a synchronization signal generation unit 604 and a transmission unit 605.

The reception unit 601 receives a discovery signal from a user apparatus UE of a neighbor cell, and passes resource information of the discovery signal to the discovery signal transmission range determination unit 602. The discovery signal transmission range determination unit 602 determines a resource range (a range of resources where a discovery signal can be transmitted and received in the neighbor cell) where the user apparatus UE of the own cell transmits a discovery signal to the neighbor cell based on the resource information, and passes the resource range to the control signal generation unit 603. The control signal generation unit 603 generates a control signal including the resource range, and transmits the control signal from the transmission unit 605 to a user apparatus UE residing in the own cell.

In the first method of step 202, the synchronization signal generation unit 604 generates a synchronization signal and transmits it from the transmission unit 605.

The functional sections shown in FIG. 30 are merely examples. For example, the base station eNB may be configured as a base station, for use in a radio communication system, configured to communicate with a user apparatus that transmits and receives a discovery signal of device-to-device communication, including:

a resource range determination unit configured to receive a discovery signal from a user apparatus that resides in a neighbor cell, and to determine a resource range in which a discovery signal can be transmitted and received in the neighbor cell based on the discovery signal; and a resource range transmission unit configured to transmit a resource range determined by the resource range determination unit to a user apparatus that resides in a cell of the base station.

Figure 31:
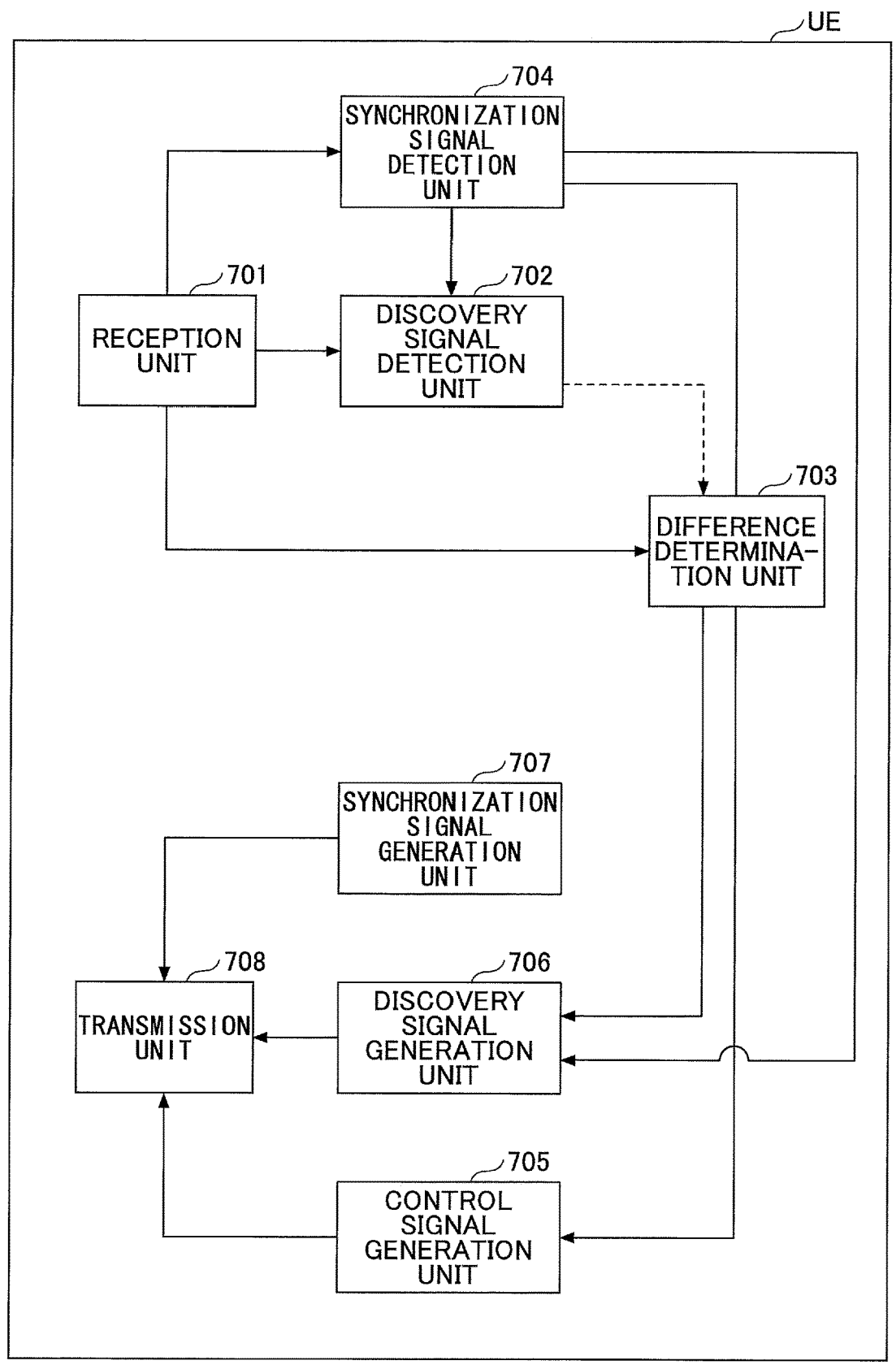
FIG. 31 is another functional block diagram of a user apparatus UE in the second embodiment.

FIG. 31 shows another functional block diagram of the user apparatus UE in the present embodiment. The example shown in FIG. 31 corresponds to the second method of step 201. As to step 202, the user apparatus UE can support any method.

FIG. 31 especially shows functions related to the present embodiment in the user apparatus UE. For example, the user apparatus UE may be further provided with necessary functions for operating as a UE complying with LTE (including LTE-Advanced).

As shown in FIG. 31, the user apparatus UE includes a reception unit 701, a discovery signal detection unit 702, a difference determination unit 703, a synchronization signal detection unit 704, a control signal generation unit 705, a discovery signal generation unit 706, a synchronization signal generation unit 707 and a transmission unit 708.

The reception unit 701 receives a discovery signal, a synchronization signal, a signal from the base station eNB and the like. The discovery signal detection unit 702 detects (decodes) a discovery signal. Also, when the discovery signal includes resource difference information (timing difference), the discovery signal detection unit 702 reports the information to the difference determination unit 703.

The difference determination unit 703 determines a resource difference (example: timing difference) based on downlink signals received from the residing base station eNB and the neighbor base station eNB, and passes the information to the control signal generation unit 705. The information is also passed to the discovery signal generation unit 706. Similarly to the user apparatus UE shown in FIG. 29, the discovery signal generation unit 706 includes a function configured to perform discovery signal transmission using resource range information included in the control signal received from the base station eNB.

The control signal generation unit 705 generates a control signal including the resource difference information and transmits the control signal from the transmission unit 708.

The discovery signal generation unit 706 obtains a resource range where a discovery signal is detected in the neighbor cell, and when a synchronization signal is detected by the synchronization signal detection unit 704 in the resource range, the discovery signal generation unit 706 generates a discovery signal at an accurate timing (time position synchronized with the neighbor cell) obtained from the synchronization signal, and transmits it from the transmission unit 708. Also, when the user apparatus UE becomes an anchor UE, and the like, the synchronization signal generation unit 707 generates a synchronization signal. The discovery signal generation unit 706 can also generate a discovery signal including a resource difference, and transmit it from the transmission unit 708.

The functional sections shown in FIG. 31 are merely examples. For example, the user apparatus UE may be configured as a user apparatus, for use in a radio communication system including a base station forming a cell, configured to transmit a discovery signal of device-to-device communication, including:

a difference determination unit configured to determine a timing difference between a residing cell and a neighbor cell based on a downlink signal received from a base station of the residing cell and a downlink signal received from a base station of the neighbor cell;

an information transmission unit configured to transmit the timing difference determined by the difference determination unit to the base station of the residing cell; and a discovery signal transmission unit configured to obtain a resource range in which a discovery signal can be received in the neighbor cell based on the timing difference, and to transmit a discovery signal at a time position synchronized with the neighbor cell in response to receiving a synchronization signal synchronized with the neighbor cell within the resource range.

Figure 32:
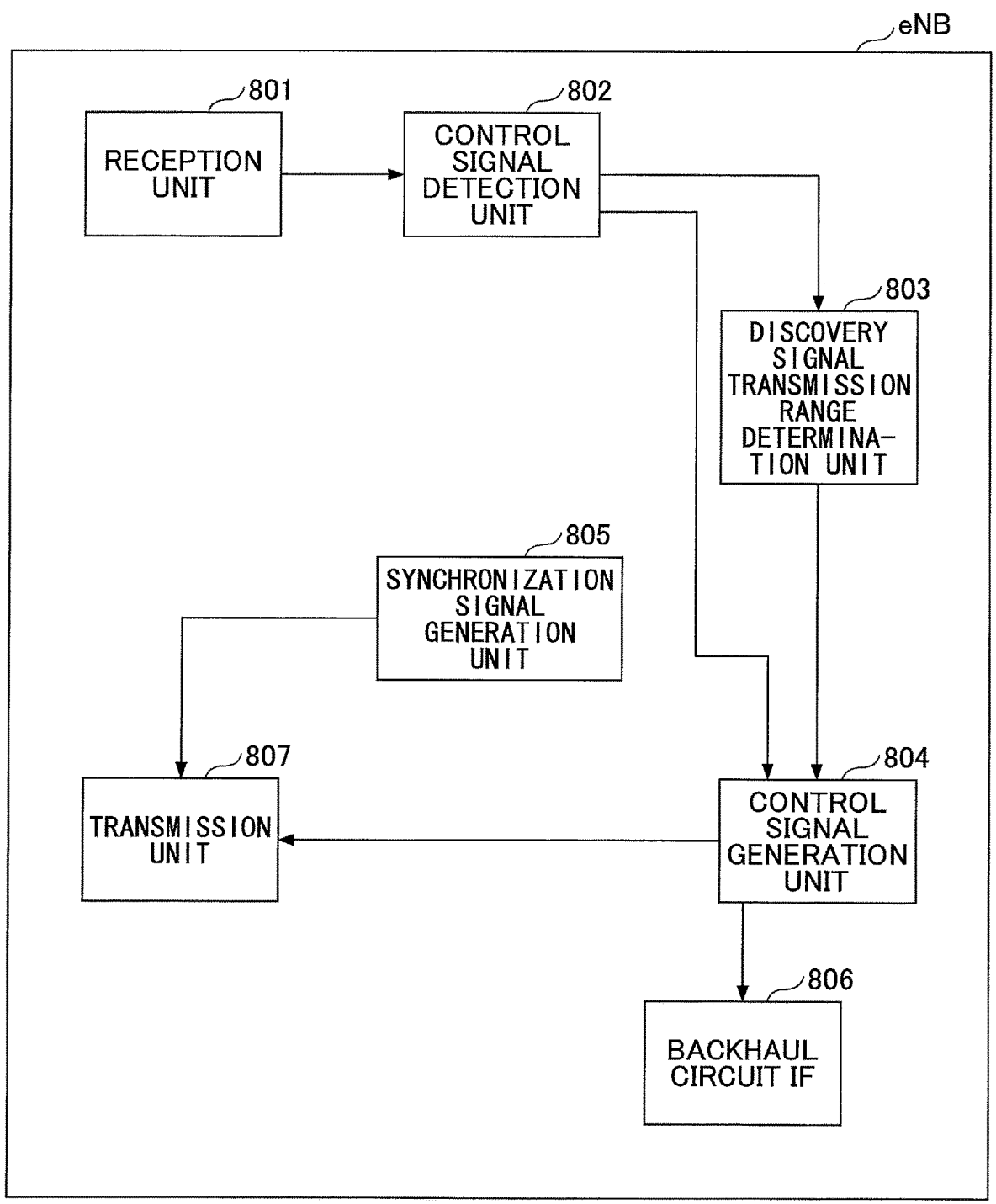
FIG. 32 is another functional block diagram of a base station eNB in the second embodiment.

FIG. 32 shows another functional block diagram of the base station eNB in the present embodiment. The example shown in FIG. 32 corresponds to the second method of step 201. As to step 202, the base station eNB can support any method.

FIG. 32 especially shows functions related to the present embodiment in the base station eNB. For example, the base station eNB may be further provided with necessary functions for operating as an eNB complying with LTE (including LTE-Advanced).

As shown in FIG. 32, the base station eNB includes a reception unit 801, a control signal detection unit 802, a discovery signal transmission range determination unit 803, a control signal generation unit 804, a synchronization signal generation unit 805, a backhaul circuit IF 806 and a transmission unit 807.

The reception unit 801 receives a control signal including a resource difference from a user apparatus UE of the own cell. The control signal detection unit 802 obtains the resource difference (example: difference of timing) from the control signal, and passes the resource difference to the discovery signal transmission range determination unit 803. The discovery signal transmission range determination unit 803 determines a resource range (a range of resources where a discovery signal can be transmitted and received in a neighbor cell) where the user apparatus UE of the own cell transmits a discovery signal to the neighbor cell based on the resource difference information, and passes the resource range to the control signal generation unit 804. The control signal generation unit 804 generates a control signal including the resource range, and transmits the control signal from the transmission unit 807 to a user apparatus UE residing in the own cell.

Also, the control signal generation unit 804 receives information of the resource difference from the control signal detection unit 802, and transmits the information to the neighbor base station eNB by the backhaul circuit IF 806. Also, the backhaul circuit IF 806 has a function for receiving a resource difference from the neighbor base station eNB, and passing the resource difference to the discovery signal transmission range determination unit 803. The discovery signal transmission range determination unit 803 can also determine a resource range for transmitting a discovery signal to the neighbor cell based on the resource difference.

In the first method of step 202, the synchronization signal generation unit 805 generates a synchronization signal and transmits it from the transmission unit 807.

The functional sections shown in FIG. 32 are merely examples. For example, the base station eNB may be configured as a base station, for use in a radio communication system, configured to communicate with a user apparatus that transmits and receives a discovery signal of device-to-device communication, including:

a resource range determination unit configured to receive, from a user apparatus that resides in a cell of the base station, a timing difference between the cell and a neighbor cell, and to determine a resource range in which a discovery signal can be transmitted and received in the neighbor cell based on the timing difference; and a resource range transmission unit configured to transmit a resource range determined by the resource range determination unit to a user apparatus that resides in the cell of the base station.

Also, in the first embodiment, each of the user apparatus UE and the base station eNB may be provided with functions of all methods in steps 101 and 102 such that any method in steps 101 and 102 can be supported. Also, in the second embodiment, each of the user apparatus UE and the base station eNB may be provided with functions of all methods in steps 201 and 202 such that any method in steps 201 and 202 can be supported.

Although the first embodiment and the second embodiment are described separately, each of the user apparatus UE and the base station eNB may be provided with both functions of the first embodiment and the second embodiment.

Effect of the Embodiment

As described above, according to an embodiment of the present invention, it becomes possible to perform transmission and reception of a discovery signal between asynchronous user apparatuses over cells even in an inter-cell asynchronous environment of a mobile communication system.

In the above, the present invention has been explained while referring to the specific embodiments. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE and the base station eNB have been explained by using functional block diagrams. However, such an apparatus may be implemented in hardware, software, or a combination thereof. The software that operates in accordance with the present invention, that is, software executed by a processor provided in the user apparatus UE, and software executed by a processor provided in the base station eNB may be stored respectively in any proper storage medium such as a RAM (Random Access Memory), a flash memory, a ROM (Read Only Memory), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international application claims priority based on Japanese patent application No. 2013-151061, filed in the JPO on Jul. 19, 2013, and the entire contents of the Japanese patent application No. 2013-151061 are incorporated herein by reference.

DESCRIPTION OF REFERENCE SIGNS

UE user apparatus
eNB base station
101, 501 reception unit
102, 502 discovery signal detection unit
103, 503 control signal detection unit
104 discovery signal monitoring range determination unit
504 discovery signal transmission range determination unit
105, 505 synchronization signal detection unit
106, 506 discovery signal generation unit
107, 507 synchronization signal generation unit
108, 508 transmission unit
201, 601 reception unit
202 discovery signal monitoring range determination unit
602 discovery signal transmission range determination unit
203, 603 control signal generation unit
204, 604 synchronization signal generation unit
205, 605 transmission unit
301, 701 reception unit
302, 702 discovery signal detection unit
303, 703 difference determination unit
304, 704 synchronization signal detection unit
305, 705 control signal generation unit
306, 706 discovery signal generation unit
307, 707 synchronization signal generation unit
308, 708 transmission unit
401, 801 reception unit
402, 802 control signal detection unit
403 discovery signal monitoring range determination unit
803 discovery signal transmission range determination unit
404, 804 control signal generation unit
405, 805 synchronization signal generation unit
406, 806 backhaul circuit IF
407, 807 transmission unit

The invention claimed is:

1. A user apparatus, for use in a radio communication system including a base station forming a cell, configured to receive a discovery signal of device-to-device communication, comprising:
a processor;
a receiver, the receiver configured to receive, from a base station of a residing cell, a resource range in which a discovery signal can be transmitted in a neighbor cell, and
the receiver further configured to receive a discovery signal at a time position that is synchronized with the neighbor cell, the time position being determined based on a timing of receiving a synchronization signal from a second user apparatus in the neighbor cell that is synchronized with the neighbor cell, wherein the synchronization signal is received a predetermined time before the resource range in which the discovery signal can be transmitted in the neighbor cell; and
a transmitter configured to transmit a synchronization signal that is synchronized with the residing cell and that is for extending a coverage area of the residing cell to the second user apparatus in the neighbor cell,
wherein the residing cell and the neighbor cell are not the same cell.

2. A user apparatus, for use in a radio communication system including a base station forming a cell, configured to transmit a discovery signal of device-to-device communication, comprising:
a processor configured to determine a timing difference between a residing cell and a neighbor cell based on a downlink signal received from a base station of the residing cell and a downlink signal received from a base station of the neighbor cell;
a transmitter configured to transmit the timing difference determined by the processor to the base station of the residing cell; and
the transmitter further configured to obtain a resource range in which a discovery signal can be received in the neighbor cell based on the timing difference, and to transmit a discovery signal at a time position synchronized with the neighbor cell in response to receiving a synchronization signal synchronized with the neighbor cell within the resource range in which the discovery signal can be received in the neighbor cell.

3. A base station, for use in a radio communication system, configured to communicate with a user apparatus that transmits and receives a discovery signal of device-to-device communication, comprising:

a processor configured to receive a discovery signal from a user apparatus that resides in a neighbor cell, and to determine a resource range in which a discovery signal can be transmitted and received in the neighbor cell based on the discovery signal; and a transmitter configured to transmit a resource range determined by the processor to a user apparatus that resides in a cell of the base station.

4. A base station, for use in a radio communication system, configured to communicate with a user apparatus that transmits and receives a discovery signal of device-to-device communication, comprising:

a processor configured to receive, from a user apparatus that resides in a cell of the base station, a timing difference between the cell and a neighbor cell, and to determine a resource range in which a discovery signal can be transmitted and received in the neighbor cell based on the timing difference; and a transmitter configured to transmit a resource range determined by the processor to a user apparatus that resides in the cell of the base station.

5. The base station as claimed in claim 4, wherein the transmitter is further configured to transmit the timing difference to a base station of the neighbor cell.

6. A discovery signal reception method performed by a user apparatus, for use in a radio communication system including a base station forming a cell, configured to receive a discovery signal of device-to-device communication, comprising:

receiving, from a base station of a residing cell, a resource range in which a discovery signal can be transmitted in a neighbor cell;

receiving a discovery signal at a time position that is synchronized with the neighbor cell, the time position being determined based on a timing of receiving a synchronization signal from a second user apparatus in the neighbor cell that is synchronized with the neighbor cell, wherein the synchronization signal is received a predetermined time before the resource range in which the discovery signal can be transmitted in the neighbor cell; and transmitting a synchronization signal that is synchronized with the residing cell and that is for extending a coverage area of the residing cell to the second user apparatus in the neighbor cell, wherein the residing cell and the neighbor cell are not the same cell.

* * * * *